US011997173B2

(12) United States Patent
Lohmar et al.

(10) Patent No.: US 11,997,173 B2
(45) Date of Patent: May 28, 2024

(54) CROSS-MOBILE NETWORK OPERATOR SERVER

(71) Applicant: Telefonaktiebolaget LM Ericsson (publ), Stockholm (SE)

(72) Inventors: Thorsten Lohmar, Aachen (DE); Robert Skog, Hässelby (SE); Hans Mattsson, Mölndal (SE); Linus Andersson, Gothenburg (SE); Claes Meltzer, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/916,002

(22) PCT Filed: Mar. 26, 2021

(86) PCT No.: PCT/EP2021/057964
§ 371 (c)(1),
(2) Date: Sep. 29, 2022

(87) PCT Pub. No.: WO2021/198083
PCT Pub. Date: Oct. 7, 2021

(65) Prior Publication Data
US 2023/0156095 A1 May 18, 2023

Related U.S. Application Data

(60) Provisional application No. 63/026,697, filed on May 18, 2020, provisional application No. 63/003,150, filed on Mar. 31, 2020.

(51) Int. Cl.
*H04L 67/51* (2022.01)
*H04L 61/4511* (2022.01)

(52) U.S. Cl.
CPC .......... *H04L 67/51* (2022.05); *H04L 61/4511* (2022.05)

(58) Field of Classification Search
CPC ............................ H04L 67/51; H04L 61/4511
(Continued)

(56) References Cited

U.S. PATENT DOCUMENTS

2005/0250509 A1* 11/2005 Choksi ................. H04W 72/21
455/436
2008/0253304 A1* 10/2008 Torabi ..................... H04L 67/51
370/254
(Continued)

OTHER PUBLICATIONS

Pearson, Managing Name Resolution, Jul. 31, 2006, https://www.pearsonitcertification.com/articles/article.aspx?p=600628&seqNum=5 (Year: 2006).*
(Continued)

*Primary Examiner* — Zi Ye
(74) *Attorney, Agent, or Firm* — Sage Patent Group

(57) ABSTRACT

A method performed by a communication device in a network comprising mobile networks operated by mobile network operators, MNOs, is provided. The method includes signaling to a first server to discover a second server having information about a public land mobile network identifier and a network service of a MNO. The second server has a first fully qualified domain name, FQDN, pointing to a provider domain. The method further includes receiving a response including a resolution or a redirection of the FQDN; signaling to discover the information about the network service; and receiving a response from the second server including a first identification of the information about the network service of the MNO or a second identification that the network service is not available. Corresponding methods performed by a first server and a second server are also provided.

26 Claims, 14 Drawing Sheets

(58) Field of Classification Search
USPC .......................................................... 709/245
See application file for complete search history.

(56) References Cited

U.S. PATENT DOCUMENTS

| | | | | |
|---|---|---|---|---|
| 2014/0349634 A1* | 11/2014 | Kukuchka | ............... | H04W 8/18 |
| | | | | 455/418 |
| 2017/0311147 A1* | 10/2017 | Agiwal | ................. | H04W 8/005 |
| 2019/0230586 A1* | 7/2019 | Buckley | ................ | H04W 48/18 |

OTHER PUBLICATIONS

Carletti, Redirects with HTTPS, Aug. 2, 2016, https://blog.dnsimple.com/2016/08/https-redirects/ (Year: 2016).*

International Search Report and Written Opinion of the International Searching Authority for PCT International Application No. PCT/EP2021/057964 dated Jun. 18, 2021.

Samsung, "Discussion on Edge Application Discovery," S6-191354, 3GPP TSG-SA WG6 Meeting #32, Roma, Italia, Jul. 3-12, 2019, 3 pages.

3GPP TR 23.748 V0.3.0, "3rd Generation Partnership Project; Technical Specification Group Services and System Aspects; Study on enhancement of support for Edge Computing in 5G Core network (5GC) (Release 17)," Jan. 2020, 40 pages.

Ericsson, "Solution to KI#1, DNS over HTTP," S2-2000197, 3GPP TSG-SA/WG2 Meeting #136-AH, Jan. 13-17, 2020, Incheon, Korea, 3 pages.

3GPP TS 26.501 V16.4.0, "3rd Generation Partnership Project; Technical Specification Group Services and System Aspects; 5G Media Streaming (5GMS); General description and architecture (Release 16)," May 2020, 72 pages.

* cited by examiner

CROSS-MOBILE NETWORK OPERATOR SERVER

CROSS REFERENCE TO RELATED APPLICATIONS

This application is a 35 U.S.C. § 371 national stage application of PCT International Application No. PCT/EP2021/057964 filed on Mar. 26, 2021, which claims the benefit of U.S. Provisional Patent Application Ser. No. 63/026,697, filed on May 18, 2020, and U.S. Provisional Patent Application Ser. No. 63/003,150, filed on Mar. 31, 2020, the disclosures and content of which are incorporated by reference herein in their entireties.

TECHNICAL FIELD

The present disclosure relates generally to communications, and more particularly to communication methods and related devices and nodes supporting wireless communications.

BACKGROUND

In some cases, external Application and Media Service Providers would like to reach all subscribers in all different internet protocol (IP) networks, fixed and mobile. A potential challenge for Application and Media Service Providers for such cases is the cardinality between an Application Service Provider and Network Operators (fixed & mobile). There are a large number of network operators and it may be impossible to have a lengthy service level agreement (SLA) discussion with each network operator and then to adjust the service offering (e.g., application programming interfaces (APIs)) to each individual network operator. Even when network operators expose the same APIs, it may be necessary to find the exposure service of the given network operator which is currently serving the subscriber.

SUMMARY

According to some embodiments of the present disclosure, a method performed by a communication device in a telecommunications network comprising a plurality of mobile networks operated by a plurality of mobile network operators and a provider domain is provided. The method includes signaling a first request to a first server to discover a second server having information about at least one of a public land mobile network, PLMN, identifier and at least one network service of a mobile network operator, MNO, serving the communication device. The second server has a first fully qualified domain name, FQDN, pointing to the provider domain. The method further includes, responsive to the first request, receiving a first response from the first server comprising a resolution or a redirection of the first FQDN to an internet protocol, IP, address for the second server having the information. The method further includes signaling a second request to the second server to discover the information about the at least one network service of the MNO. The method further includes, responsive to the second request, receiving a second response from the second server comprising a first identification of the information about the at least one network service of the MNO or a second identification that the at least one network service is not available in a mobile network of the plurality of mobile network operators.

In some embodiments, the method further includes receiving the PLMN identifier from the second server; and using the PLMN identifier to obtain access information for the at least one network service from a centralized server.

According to other embodiments of the present disclosure, a communication device is provided. The communication device includes processing circuitry; and memory coupled with the processing circuitry. The memory includes instructions that when executed by the processing circuitry causes the communication device to perform operations of the method performed by a communication device.

According to other embodiments, a method performed by a first server in a telecommunications network comprising a plurality of mobile networks operated by a plurality of mobile network operators and a provider domain is provided. The method includes receiving a first request from a communication device to discover a second server having information about at least one of a public land mobile network, PLMN, identifier and at least one network service of a mobile network operator, MNO, serving the communication device. The second server has a first fully qualified domain name, FQDN, pointing to the provider domain. The method further includes, responsive to the first request, signaling a first response to the communication device comprising a resolution or a redirection of the first FQDN to an internet protocol, IP, address for the second server having the information.

In some embodiments, the method further includes forwarding the first request to a third server in or provided by the provider domain to which the FQDN belongs. The method further includes, responsive to the forwarding, receiving a canonical name, CNAME, redirect response from the third server. The method further includes signaling the CNAME redirect response to the communication device.

According to other embodiments of the present disclosure, a first server is provided. The first server includes processing circuitry; and memory coupled with the processing circuitry. The memory includes instructions that when executed by the processing circuitry causes the first server to perform operations according to the method performed by a first server.

According to other embodiments, a method performed by a second server in a telecommunications network comprising a plurality of mobile networks operated by a plurality of mobile network operators and a provider domain is provided. The method includes receiving a request from a communication device to discover information about at least one of a public land mobile network, PLMN, identifier and at least one network service of a mobile network operator. The method further includes, responsive to the request, signaling a response towards the communication device comprising a first identification of the information about the at least one network service of the MNO or a second identification that the at least one network service is not available in a mobile network of the plurality of mobile network operators.

In some embodiments, the method further includes, responsive to the request, compiling the first identification based on the at least one network service of the MNO that is available.

In some embodiments, the method further includes checking an origin address of the request; and deriving a subscription class from the origin address.

In some embodiments, the method further includes identifying a subscriber associated with the communication device; and providing information on a subscription of the subscriber in the response.

According to other embodiments of the present disclosure, a second server is provided. The second server includes processing circuitry; and memory coupled with the processing circuitry. The memory includes instructions that when executed by the processing circuitry causes the second server to perform operations according to the method performed by a second server.

Corresponding embodiments of inventive concepts for computer products and computer programs are also provided.

Potential advantages provided by various embodiments of the present disclosure may include a simple and consistent way to discover (from an application perspective) MNO offered network and system features in a multi-MNO offering. An application service provider may leverage the network features from different MNOs (who may offer a different set of network features) without needing or requiring, e.g., an Operator Federation and without adapting the application offering to each and every MNO. A further potential advantage that may be provided by one or more embodiments may include that resolution/redirection operations may be simple to use for over-the-top (OTT) application service providers because, e.g., OTT application providers cannot integrate with each and every network operator.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
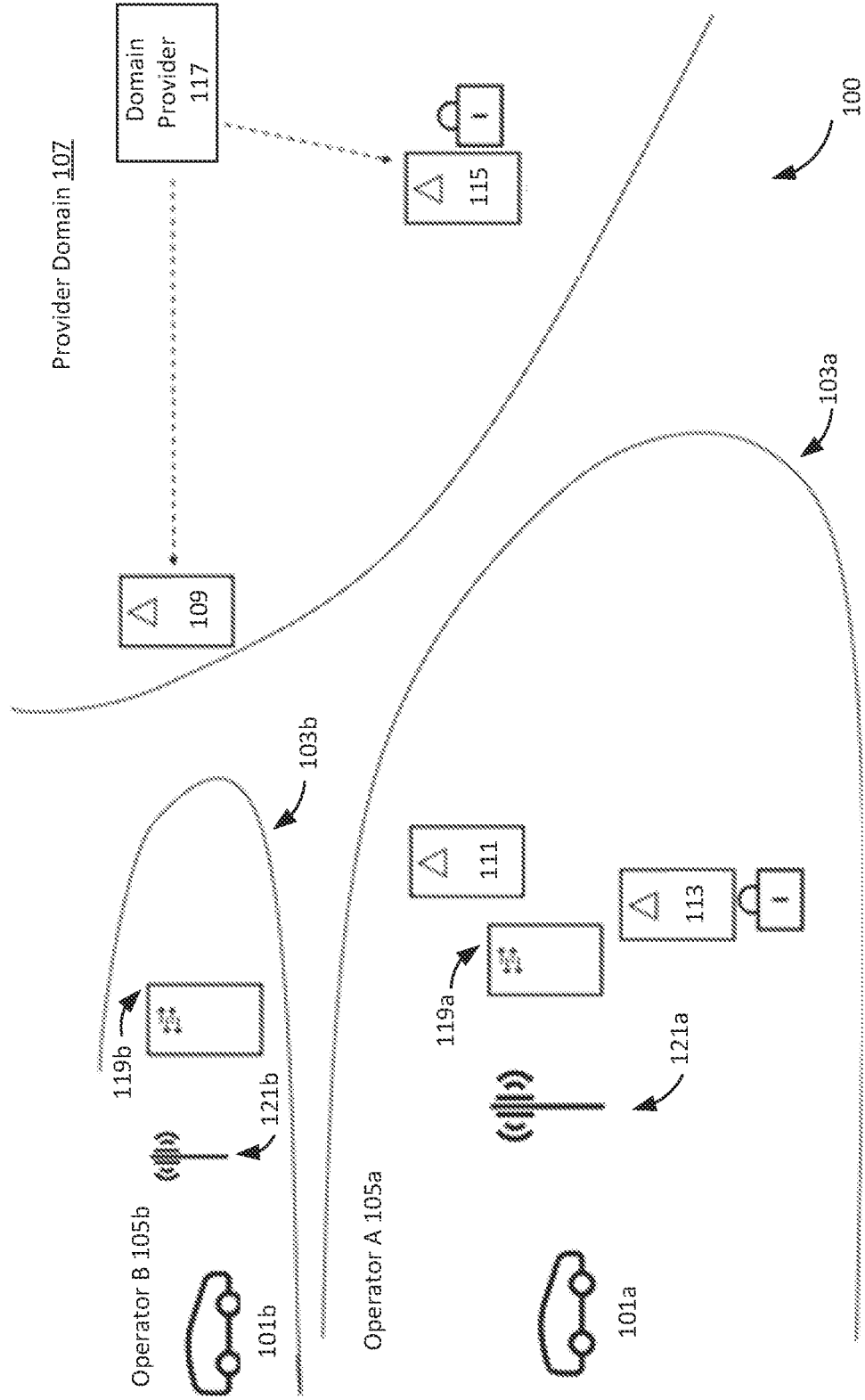
FIG. 1 illustrates an example of a general deployment architecture of mobile operator networks and a telecommunications network according to some embodiments of inventive concepts.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As referenced above, in some cases, external Application and Media Service Providers would like to reach all subscribers in all different IP networks, fixed and mobile. Potential problems with some approaches for Application and Media Service Providers to reach subscribers in different IP networks, fixed and mobile, may include the following. In addition to the cardinality challenge discussed above, a potential problem may be extended use of tethering, relay and browser-based applications (Apps). For example, an actual end-host hosting an application that is consuming the service often is not directly connected to a wide area network interface and/or cannot determine any direct information about the network operator. Thus, potential approaches such as, e.g., zzz.mnc<x>mcc<y>.pub.3gppnetworks.org may not work, since the host cannot determine a network code.

Various embodiments of the present disclosure may provide the following advantages. Various embodiments may present a simple and consistent way to discover (from an application perspective) MNO offered network and system features in a multi-MNO offering. An Application Service Provider may leverage the network features from different MNOs (who may offer a different set of network features) without needing or requiring an Operator Federation and without adapting the application offering to each and every MNO. Network features include, without limitation, network services.

In various embodiments of inventive concepts, a "Network Feature Server" (including cross Mobile Network Operator (MNO) resolution/redirection operations) is provided. While various embodiments discussed herein are explained in the non-limiting context of a Network Feature Server (NFS), the invention is not so limited. In practice, a NFS may be included within another server(s) or may include various different physical components that make up a single NFS. Additionally, the NFS may include either a "Default Feature Server" or an MNO specific feature server (MNO Feature Server). Further discussion of an exemplary Default Feature Server and MNO Feature Server are provided herein. The term Network Feature Server herein may be interchangeable and replaced with the terms NFS, Default Feature Server, MNO specific feature server, or MNO Feature Server.

In various embodiments of inventive concepts, a NFS may provide a user equipment (UE) application with information, e.g., detailed information, about the offered network features of the current mobile network (e.g., network features, which are offered by the mobile network operator at which the UE is currently camping on) in an operator independent way. Various embodiments of inventive concepts include a resolution/redirection scheme. An operational advantage that may be provided by one or more embodiments may include that the resolution/redirection operations may be simple to use for over-the-top (OTT) application service providers because, e.g., OTT application providers cannot integrate with each and every network operator.

As used herein, UE refers to a device capable, configured, arranged and/or operable to communicate wirelessly with servers, network nodes and/or other wireless devices. Unless otherwise noted, the term UE may be used interchangeably herein with user equipment (UE) and communication device. Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the radio communication network. Examples of a UE include, but are not limited to, a smart phone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A UE may support device-to-device (D2D) communication, for example by implementing a 3GPP standard for sidelink communication, and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as a machine-type communication (MTC) device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

As used herein, server refers to equipment capable, configured, arranged and/or operable to communicate directly or indirectly with a UE and/or with other servers, network nodes or equipment in a telecommunication network (including MNO networks) to enable and/or provide signaling to the UE and/or to perform other functions (e.g., administration) in the telecommunication network. Examples of servers include, but are not limited to, domain name system servers, MNO feature servers, central or decentralized default feature servers, etc.

Various embodiments of inventive concepts may include discovering a Network Feature Server of a currently serving MNO. A UE application determines from a Network Feature Server response, whether the request was handled by a Network Feature Server offered or operated by an MNO (that is, an MNO Feature Server) or not.

In some embodiments, the NFS can perform operations such as providing information on subscriptions. For example, an MNO can further subdivide/discriminate into subscription specific features such as a "subscriber with a Facebook only subscription" (e.g., which may be popular in Asia) who cannot access Netflix video streaming services, etc.

Various embodiments of inventive concepts utilize HTTPS.

Various embodiments of inventive concepts include DNS resolution and/or HTTPS redirect.

FIG. 1 illustrates an example of a general deployment architecture of mobile operator networks (103*a*, 103*b*) and a telecommunications network (100) according to some embodiments of inventive concepts. FIG. 1 depicts two MNO networks 103*a* and 103*b* of two MNOs, Operator A 105*a* and Operator B 105*b*, respectively. MNO networks 103*a* and 103*b* each include a base station 121*a* and 121*b*, respectively. FIG. 1 also depicts an "provider domain" 107 offered by a domain provider 117, for example such as an umbrella domain offered by GSMA in a standardized way (or by, e.g., an external content delivery network (CDN) or Application Service provider). For example, GSMA manages domain names such as pub.3gppnetworks.org. FIG. 1 further depicts communications devices 101*a*, 101*b*; Domain Name System (DNS) server 109 (e.g., a GSMA DNS server); DNS server 111 (e.g., an MNO DNS server); MNO Feature Server 113 having a HTTPS certificate; Default Feature Server 115 has as HTTPS certificate (e.g., a HTTPS certificate from GSMA); and user plane function network nodes (UPFs) 119*a*, 119*b*.

Still referring to FIG. 1, MNO network 103*a* includes an MNO DNS server 111 and an MNO Feature Server 113, while MNO network 103*b* does not include an MNO DNS server or an MNO Feature Server. Provider domain 107 includes a Default Feature Server 115, which be a central or decentralized server. DNS server 109 of provider domain 107 may assign an internet protocol (IP)-anycast address for Default Feature Server 115 in DNS. MNO Feature Server 113 may have, e.g., either an IP-anycast address or a name according to an MNO DNS server 111 entry.

Figure 2:
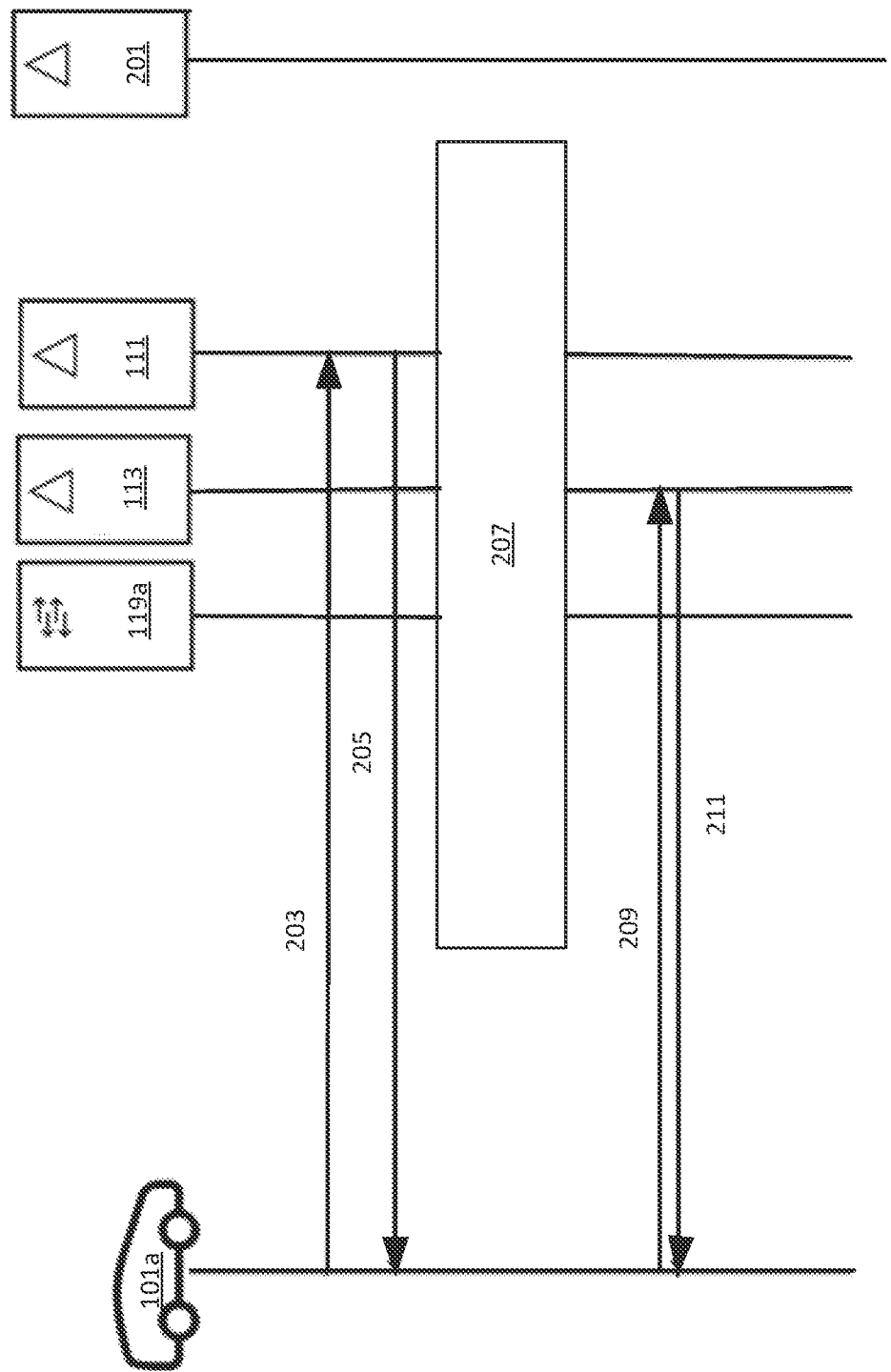
FIG. 2 is a signaling diagram illustrating a successful discovery procedure according to some embodiments of inventive concepts.
Figure 4:
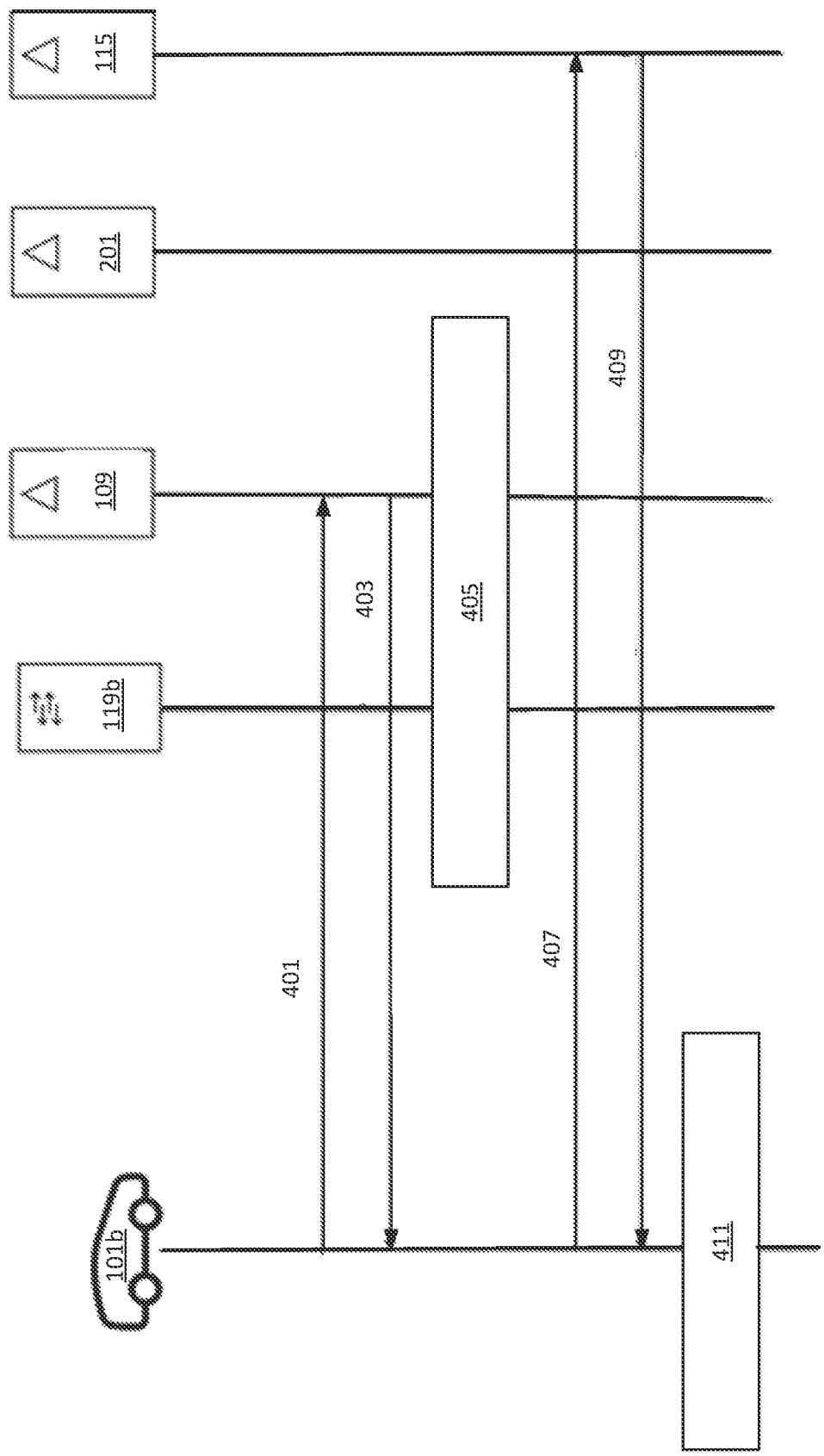
FIG. 4 is a signaling diagram illustrating an unsuccessful discovery procedure according to some embodiments of inventive concepts.

As shown, the communication system of FIG. 1 as a whole enables connectivity between connected communication devices 101*a*, 101*b* (e.g., corresponding to UEs 4491, 4492 of FIG. 16) and a host computer (e.g., host computer 201 of FIGS. 2 and 4 corresponding to host computer 4430 of FIG. 16). The connectivity may be described as an over-the-top (OTT) connection (e.g., corresponding to OTT connection 4450 of FIG. 16). Host computer 201 and the connected UEs 101a, 101b are configured to communicate data and/or signaling via the OTT connection (corresponding to OTT connection 4450 of FIG. 16 (not shown in FIG. 1)), using telecommunications access network 100 (e.g., corresponding to access network 4411 of FIG. 16), a core network (e.g., corresponding to core network 4414 of FIG. 16 (not shown in FIG. 1), any intermediate network (e.g., corresponding to intermediate network 4420 of 16 (not shown in FIG. 1) and possible further infrastructure (not shown) as intermediaries. The OTT connection may be transparent in the sense that the participating communication devices through which the OTT connection passes are unaware of routing of uplink and downlink communications. For example, base station 121a (e.g., corresponding to base station 4412 of FIG. 16) may not or need not be informed about the past routing of an incoming downlink communication with data originating from host computer 201 to be forwarded (e.g., handed over) to a connected UE 101a. Similarly, base station 121a need not be aware of the future routing of an outgoing uplink communication originating from UE 101a towards host computer 201.

The term "IP-anycast address" is used in a non-limiting manner and can refer to any type of IP-anycast address that allows for multiple machines (e.g., servers) to share the same IP address. Based on the location of a user request (e.g., communication device 101a), the request may be routed to the machine (e.g., server) in the network that has the IP-anycast address and is closest to the communication device (e.g., by number of hops).

In various embodiments of the inventive concepts, an application in the UE (e.g., in the vehicle/communication device 101a) uses a fully qualified domain name (FQDN) which is pointing to a domain (e.g., an umbrella domain) in order to discover specific features of the currently service MNO (e.g., Operator A 101a). The FQDN may be resolved or redirected by either a Default Feature Server (e.g., Default Feature Server 115) or a MNO specific feature server (e.g., MNO Feature Server 113).

A first DNS resolution based operation will now be discussed.

In some embodiments, DNS is used for resolving an "umbrella FQDN" to the IP address of the Network Feature Server. The DNS server can be offered by the domain provider 117 (e.g., an umbrella domain provider such as GSMA) or by an MNO (e.g., MNO 101a). In a normal situation, the domain provider 117 (e.g., GSMA) operates a DNS (e.g., DNS 109), which resolves or redirects the FQDN to an IP address (e.g., IP address exemplary embodiments discussed herein) or a canonical name (CNAME) (e.g., CNAME exemplary embodiments discussed herein).

IP Address Exemplary Embodiments will now be discussed.

In some embodiments, the IP address is an IP anycast address. As a consequence, no additional DNS server needed. When a MNO (e.g., MNO 101a) offers a MNO Feature Server (e.g., MNO Feature Server 113), the MNO Feature Server is configured with that IP anycast address. As consequence, all HTTP traffic is routed to the closest Network Feature Server, which is the MNO Feature Server.

Routing to a closest Network Feature Server includes, but is not limited to, identifying the closest Network Feature Server via the number of hops on a route, a routing metric, statically configuring the routing (e.g., in a routing protocol), etc.

FIG. 2 is a signaling diagram illustrating a successful discovery procedure using an IP anycast address according to some embodiments of inventive concepts. Request 203 is resolved to MNO Network Feature Server 113. Communication device 101a signals a request 203 to DNS server 111 to get the IP address for a Network Feature Server. Responsive to request 203, DNS Server 111, signals a response 205 to communication device 101a providing an IP anycast address. As indicated by 207, MNO Network Feature Server 113 has via a Border Gateway Protocol (BGP) or similar procedure made it possible to route IP packets to the closest Network Feature Server. In the exemplary embodiment of FIG. 2, the closest Network Feature Server is MNO Feature Server 113. Responsive to receiving the IP anycast address, communication device 101, signals request 209 to MNO Feature Server 113 to discover network features (e.g., services and how to access the services). For example, MNO Network Feature Server 113 may act as API gateway, e.g. to activate a Background Data Transfer (BDT) type of policy. Responsive to request 209, MNO Feature Server 113 provides response 211 to communication device 101a including information on available network services (e.g., types of services available and how to access the services). Host computer 201 and communication device 101a are configured to communicate data and/or signaling via a OTT connection (corresponding to OTT connection 4450 of FIG. 16).

Figure 3:
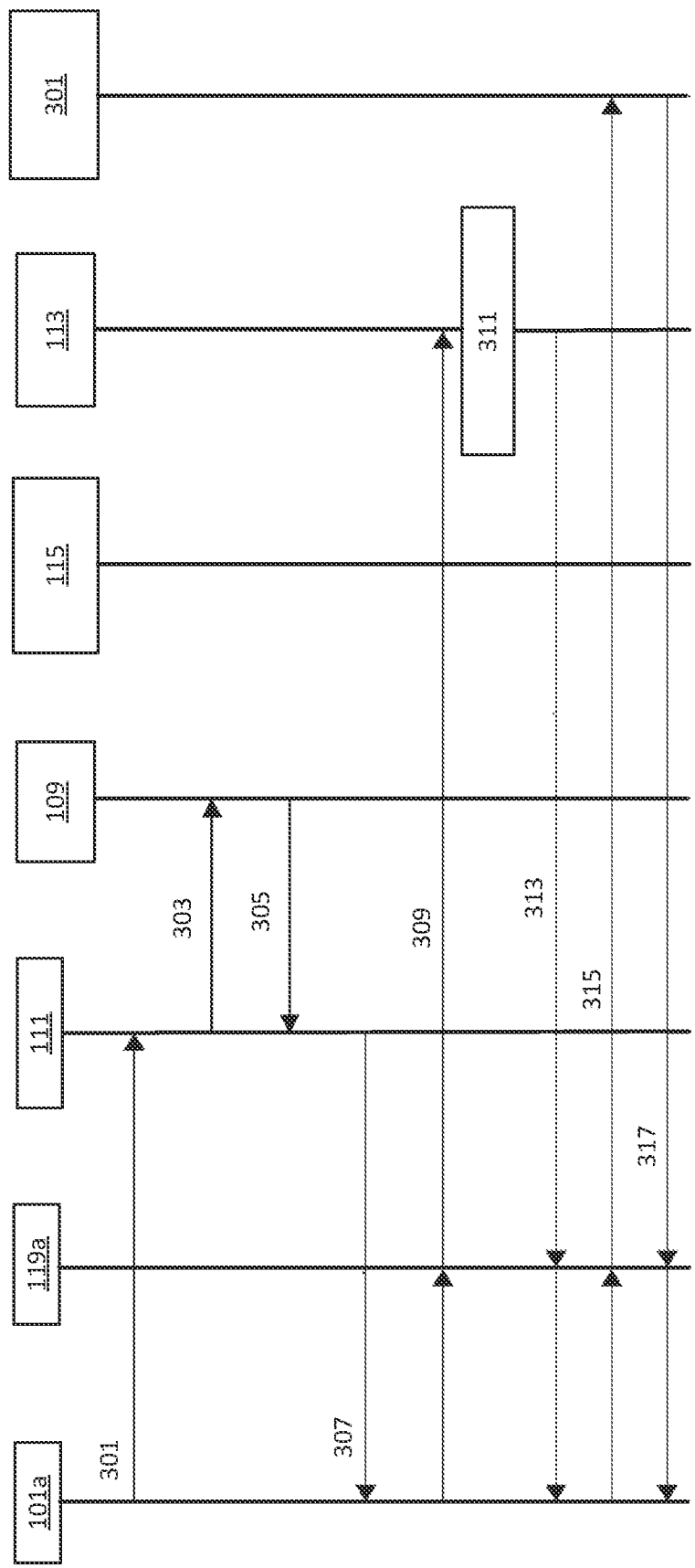
FIG. 3 is a signaling diagram illustrating a successful discovery procedure according to some embodiments of inventive concepts.

FIG. 3 is a signaling diagram further illustrating a successful discovery procedure using an IP anycast address according to some embodiments of inventive concepts. Communication device 101a signals a request 301 to MNO DNS server 111 to get the IP address for a Network Feature Server. MNO DNS server 111 forwards 303 request 301, or information from request 301, to central DNS server 109. Responsive to forwarding 303, central DNS server 109 signals response 305 to MNO DNS server 111 providing an IP anycast address for MNO Network Feature Server 113. Responsive to receiving the IP anycast address, MNO DNS server 111 signals 307 the IP anycast address of MNO Network Feature Server 113 to communication device 101a. Responsive to receiving the IP anycast address of MNO Network Feature Server 113, communications device 101a signals HTTPS request 309 to MNO Network Feature Server 113 to discover network features (e.g., services and how to access the services).

Still referring to FIG. 3, MNO Network Feature Server 113 is considered a "Trusted" NFS, since the MNO is operating the NFS. The Trusted MNO Network Feature Server 113 can act as a trusted application function AF (see e.g., 3GPP TS 23.501, Rel. 16 and query information from 5G Network Functions like a Policy Control Function (PCF) (see e.g., Policy Control Function, 3GPP TS 23.501, Rel. 16). As indicated by 311, MNO Feature Server 113 compiles response 313 based on the available network features. In some embodiments, an advanced MNO Network Feature Server checks the origin address (i.e. requester address (e.g., communication device 101a) and derives a subscription class (e.g. Prepaid) from the requester address. In some embodiments, an even more advanced Network Feature Server can identify the subscriber and can provide details on the subscription (e.g., remaining traffic volume) in the MNO Feature Server response 313.

Still referring to FIG. 3, in an HTTPS environment (e.g., operations 309-317), the interactions with MNO Feature Server 113 should be HTTPS protected. For DNS level resolution, an HTTPS certificate from the domain (e.g., an HTTPS certificate of Default Network Feature Server 115 in provider domain 107) needs to be distributed to the MNO Feature Server (e.g. MNO Feature Server 113), so that MNO Feature Server can be seen as an "authorized speaking partner". HTTPS certificates may be distributed using protocols like LURK.

Still referring to FIG. 3, as indicated by 311, the Network Feature Server of the operator (e.g., MNO Feature Server 113) includes at least the following:
- MNO specific FQDNs (e.g., URLs) for network APIs like a policy server (e.g., relay to a PCF) or a background data delivery server or a Network Performance Prediction server (e.g., relay to an NWDAF);
- An MNO set of parameters to invoke the different network APIs (e.g., not all MNOs offer all APIs with all possible features);
- A unique identifier of the MNO serving network so that the vehicle/communication device 101a (application client) can query an application service provider (e.g., MNO Policy Server 301) specific mappings;
- Subscription and subscription status specific information, e.g., bundled services, binge-on, etc. Subscription status includes, e.g., remaining data volume, etc.; and/or
- Filtering according to requesting application (sandboxing between applications).

Still referring to FIG. 3, responsive to request 311, MNO Feature Server 113 signals response 313 to communication device 101a including information on available network services (e.g., types of services available and how to access the services). In some embodiments, responsive to receiving response 311, communication device 101a signals HTTPS request 315 to MNO Policy server 301 for an available service to MNO Policy Server 301. HTTPS request 315 includes, for example, a background data transfer request, a request for a higher quality of service (QoS), a request for specific charging such as sponsored data, etc. MNO Policy Server 301 responds with response 317 indicating whether the policy request was successful or not for the application to act accordingly.

FIG. 4 is a signaling diagram illustrating an unsuccessful discovery procedure according to some embodiments of inventive concepts. In the exemplary embodiment of FIG. 4, communication device 101b determines 411 from response 409, that the currently serving network (e.g., network 103b) is not supporting a Network Feature Server, thus it is not possible to activate a background data transfer policy on the current serving network.

Referring to FIG. 4, communication device 101b signals request 401 to DNS server 109 to get the IP address for a Network Feature Server. Responsive to request 402, DNS server 109, signals a response 403 to communication device 101b providing an IP anycast address. As indicated by 405, because MNO operator 105n has no Network Feature Server support, request 407 will land at Central Network Function Server 115 via a Border Gateway Protocol (BGP) or similar procedure. Thus, responsive to receiving the IP anycast address, communication device 101b, signals request 407 to Central Feature Server 115 to discover network features (e.g., services and how to access the services). Responsive to request 407, Central Feature Server 115 provides response 409 to the application of communication device 101b indicating that no network feature is available. Central Feature Server 115 is deployed outside of the MNO network (e.g., network 103b). Host computer 201 and communication device 101b are configured to communicate data and/or signaling via a OTT connection (corresponding to OTT connection 4450 of FIG. 16).

CNAME Resolution/Redirection Exemplary Embodiments will now be discussed.

When a CNAME is used, a DNS server (e.g., DNS "umbrella" server 109) may resolve based on the requester information to a CNAME (e.g., a FQDN from MNO domain). As a consequence, the DNS server delegates the resolution to a MNO DNS server (e.g., MNO DNS server 111), which may then resolve the MNO FQDN into an MNO specific feature server IP address.

A CNAME redirect does not need the usage of IP anycast addresses, e.g. when the coordination among MNOs may be too complicated.

Figure 5:
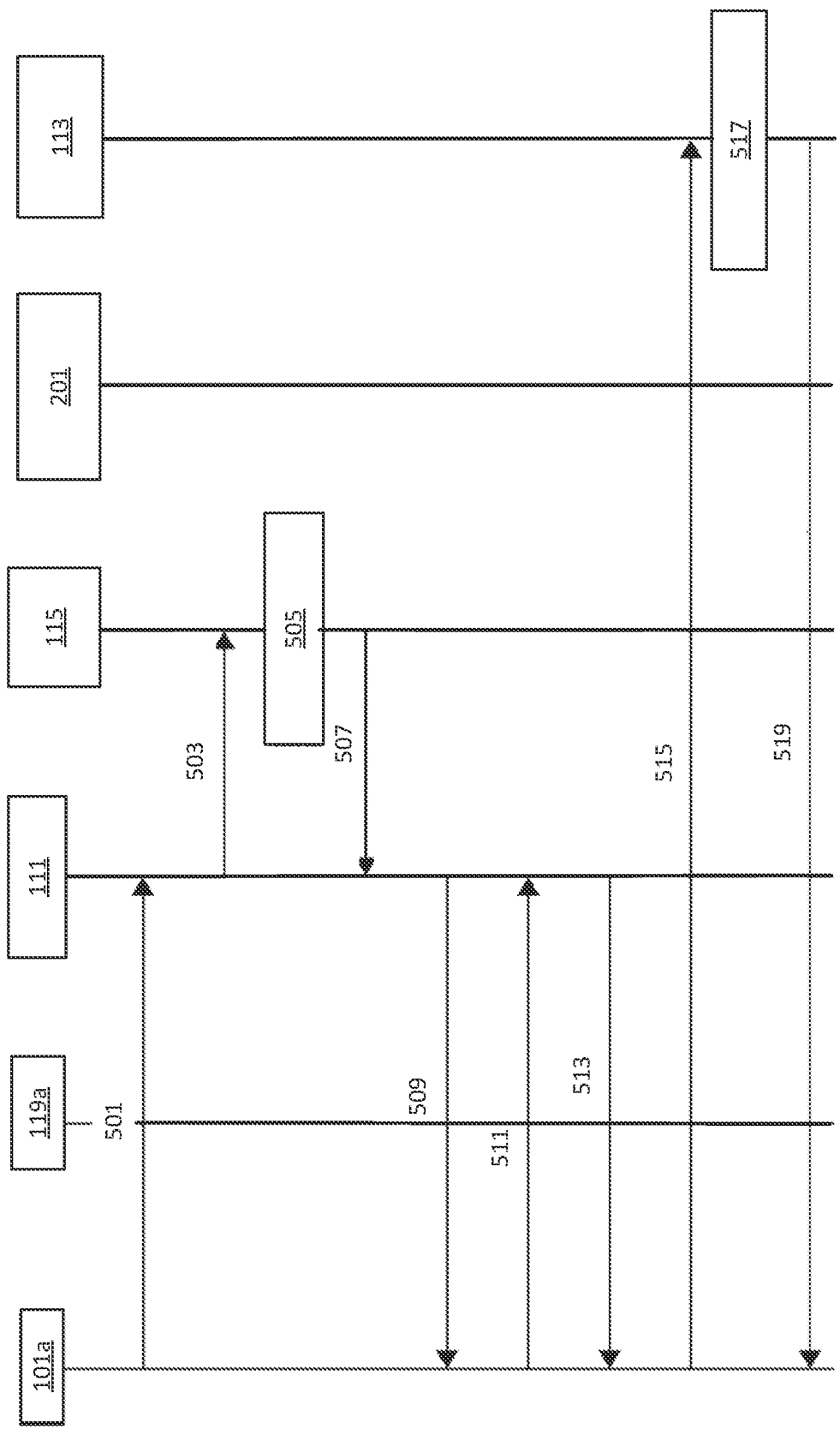
FIG. 5 is a signaling diagram illustrating a canonical name (CNAME) redirect procedure according to some embodiments of inventive concepts.

FIG. 5 is a signaling diagram illustrating a CNAME redirect procedure according to some embodiments of inventive concepts.

Referring to FIG. 5, communication device 101a signals a DNS request 501 to MNO DNS server 111 to get the IP address of a Network Feature Server having a first FQDN. MNO DNS server 111 forwards 503 request 501, or information from request 501, to the domain DNS server (e.g., central DNS server 115) to which the first FQDN belongs. For example, a "3gppnetworks.org" type of FQDN is forwarded to a DNS sever (e.g., DNS server 109) operated by a domain provider 117 (e.g., GSMA).

As indicated by 505, central DNS server 109 determines the origin from where the DNS query message 501, 503 was sent. In some embodiments, the origin is the IP address of the MNO DNS server 111, but may also be other types of information (e.g., identity information).

Operations 507-513 are performed for communication device 101a to rerun the DNS query procedure with the new FQDN in order to get an IP address for MNO Network Feature Server 113.

When the central DNS server 109 has found an entry (e.g., MNO Network Feature server 113) for the origin, it provides a CNAME redirect response 507 to MNO DNS server 111, e.g. telling the vehicle/communication device 101a to contact a different FQDN.

MNO DNS server 111 forwards 509 the CNAME redirect response 507, or information from the CNAME redirect response, to communication device 101a. Responsive to forwarding, communication device 101a signals request 511 to MNO DNS server 111 to get the IP address for MNO Feature Server 113. Responsive to request 511, MNO DNS server 111 signals response 513 to communication device 101a providing the IP address of MNO Feature Server 113.

Responsive to receiving the IP address, communications device 101a signals HTTPS request 515 to MNO Network Feature Server 113 to discover network features (e.g., services and how to access the services).

Still referring to FIG. 5, in an HTTPS environment (e.g., operations 515-519), the interactions with MNO Feature Server 113 should be HTTPS protected. For DNS level resolution, an HTTPS certificate from the domain (e.g., an HTTPS certificate of umbrella Default Network Feature Server 115 in provider domain 107) needs to be distributed to the MNO Feature Server (e.g. MNO Feature Server 113), so that MNO Feature Server can be seen as an "authorized speaking partner". HTTPS certificates may be distributed using protocols like LURK.

Still referring to FIG. 5, as indicated by 517, the Network Feature Server of the operator (e.g., MNO Feature Server 113) includes at least the following:
- MNO specific FQDNs (e.g., URLs) for network APIs like a policy server (e.g., relay to a PCF) or a background data delivery server or a Network Performance Prediction server (e.g., relay to an NWDAF);

An MNO set of parameters to invoke the different network APIs (e.g., not all MNOs offer all APIs with all possible features);

A unique identifier of the MNO serving network so that the vehicle/communication device 101a (application client) can query an application service provider (e.g., MNO Policy Server 301) specific mappings;

Subscription and subscription status specific information, e.g., bundled services, binge-on, etc. Subscription status includes, e.g., remaining data volume, etc.; and/or Filtering according to requesting application (sandboxing between applications).

Still referring to FIG. 5, responsive to request 515, MNO Feature Server 113 signals response 519 to communication device 101a including information on available network services (e.g., types of services available and how to access the services).

In some embodiments, responsive to receiving response 519, communication device 101a signals a HTTPS request to an MNO Policy server (e.g., MNO Policy server 201, 301) for an available service, which may include, for example, a background data transfer request, a request for a higher quality of service (QoS), a request for specific charging such as sponsored data, etc. MNO Policy Server (e.g., MNO Policy Server 201, 301 responds with a response indicating whether the policy request was successful or not for the application to act accordingly.

HTTPS Redirection and Delegation Exemplary Embodiments will now be discussed.

A possible drawback of DNS level redirect discussed above (usage of IP anycast or CNAME redirect) may be that the HTTPS client (or transport layer security (TLS) client) of the communication device still expects a certificate of the domain 107. DNS level redirects are transparent to the HTTPS level. Sharing security certificates among different MNOs from a domain 107 (e.g., an umbrella domain) may be considered as a security risk.

Thus, other exemplary embodiments provide HTTPS redirection. A Network Feature Server of a domain (e.g., an umbrella domain) explicitly delegates the response handling to a MNO Feature Server. As consequence, the MNO owned domain certificate can be used. Of course, the FQDNs of MNO Network Feature servers must be known to the domain.

Figure 6:
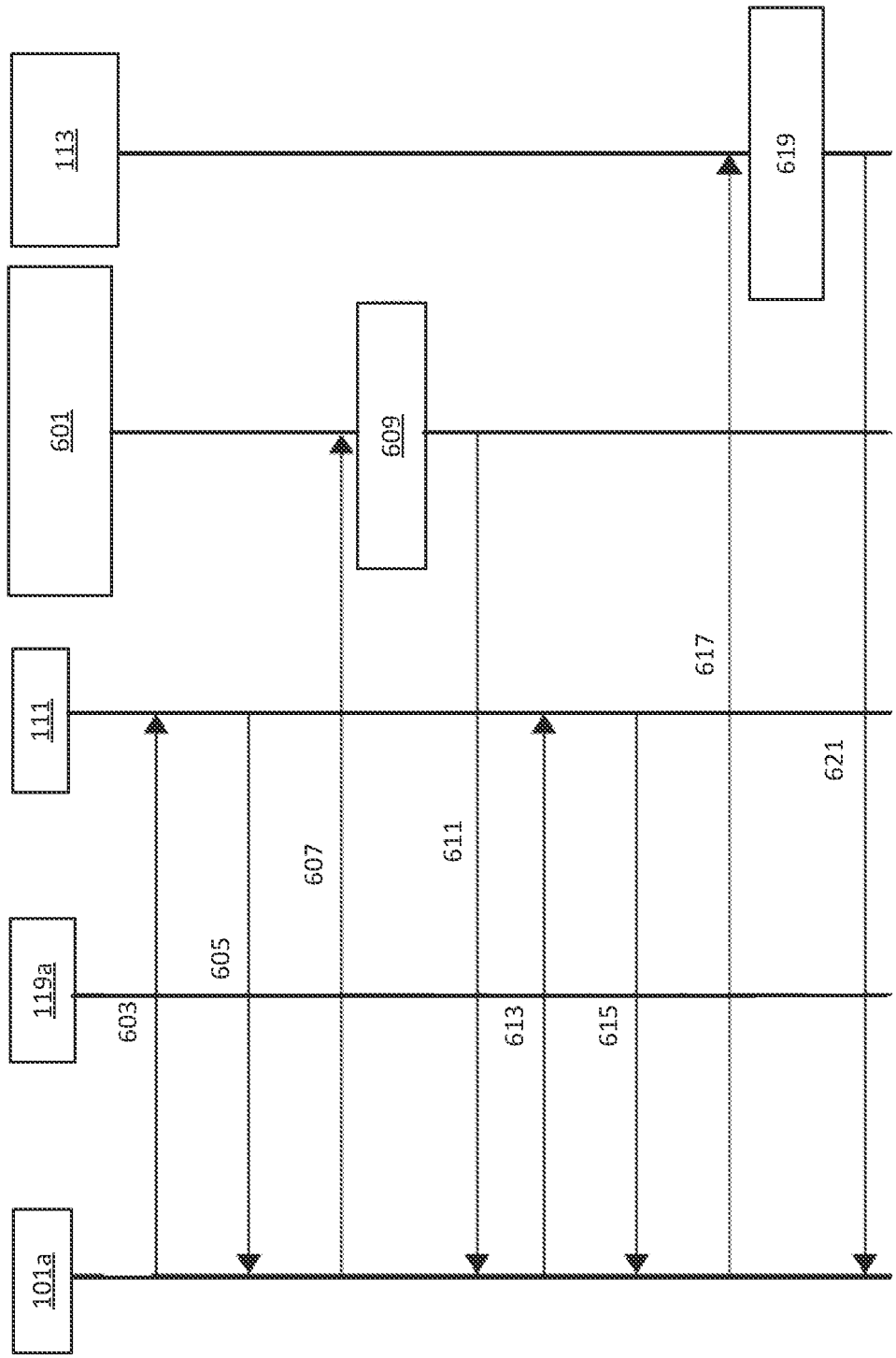
FIG. 6 is a signaling diagram illustrating a hypertext transfer protocol secure (HTTPS) redirect based resolution according to some embodiments of inventive concepts.

FIG. 6 is a signaling diagram illustrating a HTTPS redirect based resolution according to some embodiments of inventive concepts. The exemplary embodiment of FIG. 6 includes a Network Feature Redirector/Central Network Function Server/Default Feature Server 601 (e.g., Default Feature Server 115) in the domain (e.g., provider domain 107, which can be an umbrella domain).

Referring to FIG. 6, communication device 101a signals a request 603 to DNS server 111 to get the IP address for Default Feature Server 601. Responsive to request 603, DNS Server 111 signals response 605 to communication device 101a providing an IP address for network feature redirector server 601.

Responsive to receiving the IP address for Network Feature Redirector server 601, communication device 101a signals HTTPS request 607 to Default Feature Server 601 to discover network features (e.g., services and how to access the services).

Still referring to FIG. 6, as indicated by 609, the HTTP request 607 for network features reaches Default Feature Server 601, which is operated by a domain provider 117 (e.g., GSMA or the actual application service provider). At 609, Default Feature Server 601 checks the origin of the request.

When the origin is known and the MNO offers a Network Feature Server, then Default Feature Server 601 is executing an HTTP redirect, and optionally also delegating the HTTPS certificate to the MNO.

When the origin is not known or there is no MNO specific Network Feature Server available/registered, Default Feature Server 601 provides a response.

In the exemplary embodiment of FIG. 6, Default Feature Server 601 provides HTTPS response 611 redirecting communication device 101a to MNO Network Feature server 113.

Responsive to HTTPS response 611, communication device 101a signals DNS request 613 to DNS Server 111 to get the IP address for MNO Network Feature Server 113. Responsive to request 613, DNS Server 111 signals response 615 to communication device 101a providing an IP address for MNO Network Feature Server 113.

Responsive to receiving the IP address, communications device 101a signals HTTPS request 515 to MNO Network Feature Server 113 to discover network features (e.g., services and how to access the services).

Still referring to FIG. 6, as indicated by 619, the Network Feature Server of the operator (e.g., MNO Feature Server 113) includes at least the following:

MNO specific FQDNs (e.g., URLs) for network APIs like a policy server (e.g., relay to a PCF) or a background data delivery server or a Network Performance Prediction server (e.g., relay to an NWDAF);

An MNO set of parameters to invoke the different network APIs (e.g., not all MNOs offer all APIs with all possible features);

A unique identifier of the MNO serving network so that the vehicle/communication device 101a (application client) can query an application service provider (e.g., MNO Policy Server 301) specific mappings;

Subscription and subscription status specific information, e.g., bundled services, binge-on, etc. Subscription status includes, e.g., remaining data volume, etc.; and/or Filtering according to requesting application (sandboxing between applications).

Still referring to FIG. 6, responsive to HTTPS request 617, MNO Feature Server 113 signals HTTPS response 621 to communication device 101a including information on available network services (e.g., types of services available and how to access the services).

In some embodiments, responsive to receiving HTTPS response 621, communication device 101a signals a HTTPS request to an MNO Policy server (e.g., MNO Policy server 201, 301) for an available service, which may include, for example, a background data transfer request, a request for a higher quality of service (QoS), a request for specific charging such as sponsored data, etc. MNO Policy Server (e.g., MNO Policy Server 201, 301) responds with a response indicating whether the policy request was successful or not for the application to act accordingly.

In some embodiments, an application service provider needs to negotiate the possibility to use network features with the MNO. For example, the application provider needs to negotiate the usage of QoS or background data type of network features with the MNO. As result of this negotiation and provisioning procedure, the application service provider can get the FQDN for the Network Feature Server. Note, that the application service provider can act as an domain provider and use its own HTTPS redirection server to handle the request dispatching.

Figure 7:
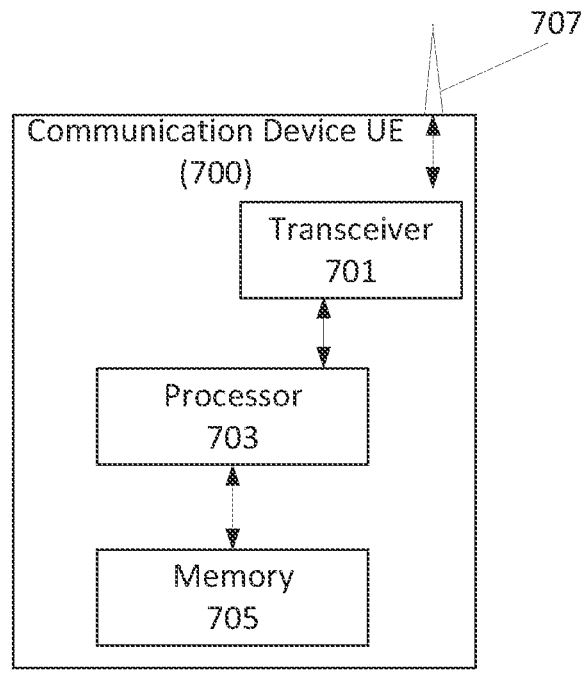
FIG. 7 is a block diagram illustrating a communication device according to some embodiments of inventive concepts.

FIG. 7 is a block diagram illustrating a communication device (also referred to as a vehicle, mobile terminal, a mobile communication terminal, a wireless communication device, a wireless terminal, mobile device, a wireless communication terminal, UE, a user equipment node/terminal/device, etc.) configured to provide operations and wireless communications according to some embodiments of inventive concepts. (Communication device 700 may be provided, for example, as discussed below with respect to wireless device 4110 of FIG. 13.) As shown, communication device 700 may include an antenna 707 (e.g., corresponding to antenna 4111 of FIG. 13), and transceiver circuitry 701 (also referred to as a transceiver, e.g., corresponding to interface 4114 of FIG. 13) including a transmitter and a receiver configured to provide uplink and downlink radio communications with a server(s) or a base station(s) (e.g., corresponding to network node 4160 of FIG. 13, also referred to as a RAN node) of a telecommunication network. Communication device 700 may also include processing circuitry 703 (also referred to as a processor, e.g., corresponding to processing circuitry 4120 of FIG. 13) coupled to the transceiver circuitry, and memory circuitry 705 (also referred to as memory, e.g., corresponding to device readable medium 4130 of FIG. 13) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that separate memory circuitry is not required. Communication device 700 may also include an interface (such as a user interface) coupled with processing circuitry 703, and/or communication device 700 may be incorporated in a vehicle.

As discussed herein, operations of communication device 700 may be performed by processing circuitry 703 and/or transceiver circuitry 701. For example, processing circuitry 703 may control transceiver circuitry 701 to transmit communications through transceiver circuitry 701 over a radio interface to a server or radio access network node (also referred to as a base station) and/or to receive communications through transceiver circuitry 701 from a server or a RAN node over a radio interface. Moreover, modules may be stored in memory circuitry 705, and these modules may provide instructions so that when instructions of a module are executed by processing circuitry 703, processing circuitry 703 performs respective operations (e.g., operations discussed herein with respect to example embodiments relating to communication devices).

Figure 8:
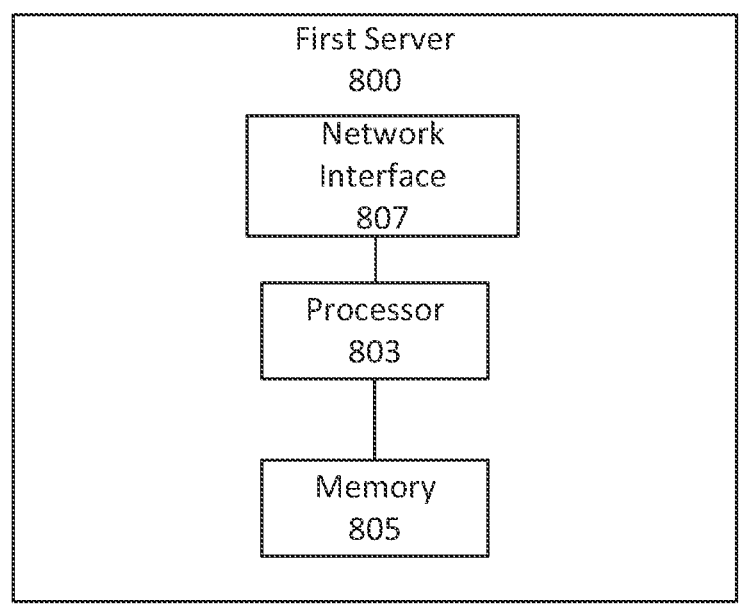
FIG. 8 is a block diagram illustrating a first server according to some embodiments of inventive concepts.

FIG. 8 is a block diagram illustrating elements of a first server (e.g., an MNO DNS server 111, a Central DNS server 109, etc.) of a telecommunication network configured to provide operations and communication according to embodiments of inventive concepts. As shown, the first server may include network interface circuitry 807 (also referred to as a network interface) configured to provide communications with other servers or nodes of the telecommunications network and/or a MNO network. The first server may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the first server may be performed by processing circuitry 803 and/or network interface circuitry 807. For example, processing circuitry 803 may control network interface circuitry 807 to transmit communications through network interface circuitry 807 to one or more other servers or network nodes and/or to receive communications through network interface circuitry from one or more other servers or network nodes. Moreover, modules may be stored in memory 805, and these modules may provide instructions so that when instructions of a module are executed by processing circuitry 803, processing circuitry 803 performs respective operations (e.g., operations discussed herein with respect to example embodiments relating to first servers).

Figure 9:
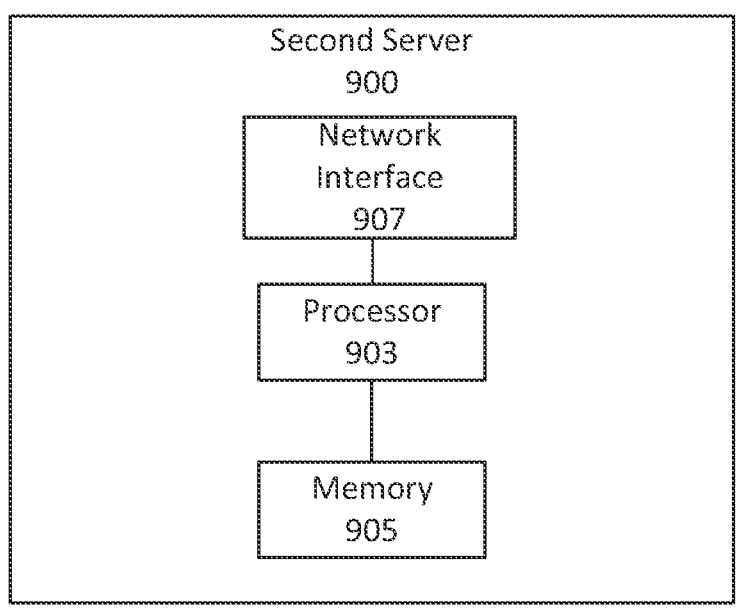
FIG. 9 is a block diagram illustrating a second server according to some embodiments of inventive concepts.

FIG. 9 is a block diagram illustrating elements of a second server (e.g., an MNO Network Feature Server 113, a Central Network Feature Server 115, etc.) of a telecommunication network configured to provide operations and communication according to embodiments of inventive concepts. As shown, the second server may include network interface circuitry 907 (also referred to as a network interface) configured to provide communications with other servers or nodes of the telecommunications network and/or a MNO network. The second server may also include a processing circuitry 903 (also referred to as a processor) coupled to the network interface circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the second server may be performed by processing circuitry 903 and/or network interface circuitry 907. For example, processing circuitry 903 may control network interface circuitry 907 to transmit communications through network interface circuitry 907 to one or more other servers or network nodes and/or to receive communications through network interface circuitry from one or more other servers or network nodes. Moreover, modules may be stored in memory 905, and these modules may provide instructions so that when instructions of a module are executed by processing circuitry 903, processing circuitry 903 performs respective operations (e.g., operations discussed herein with respect to example embodiments relating to second servers).

Now that the operations of various components have been described, operations specific to the communication device 101*a*, 101*b* (implemented using the structure of the block diagram of FIG. 7) will now be discussed with reference to the flow chart of FIG. 10 according to some embodiments of inventive concepts. For example, modules may be stored in memory 705 of FIG. 7, and these modules may provide instructions so that when the instructions of a module are executed by respective network equipment processing circuitry 703, processing circuitry 703 performs respective operations of the flow chart. Each of the operations described in FIG. 10 can be combined and/or omitted in any combination with each other, and it is contemplated that all such combinations fall within the spirit and scope of this disclosure.

The block diagram in FIG. 7 illustrates an embodiment of a communication device (700) which includes a processing circuitry (703) and a memory (705) coupled with the processing circuitry. The memory (705) includes instructions that when executed by the processing circuitry (703) causes the communication device (700) to perform operations.

Figure 10:
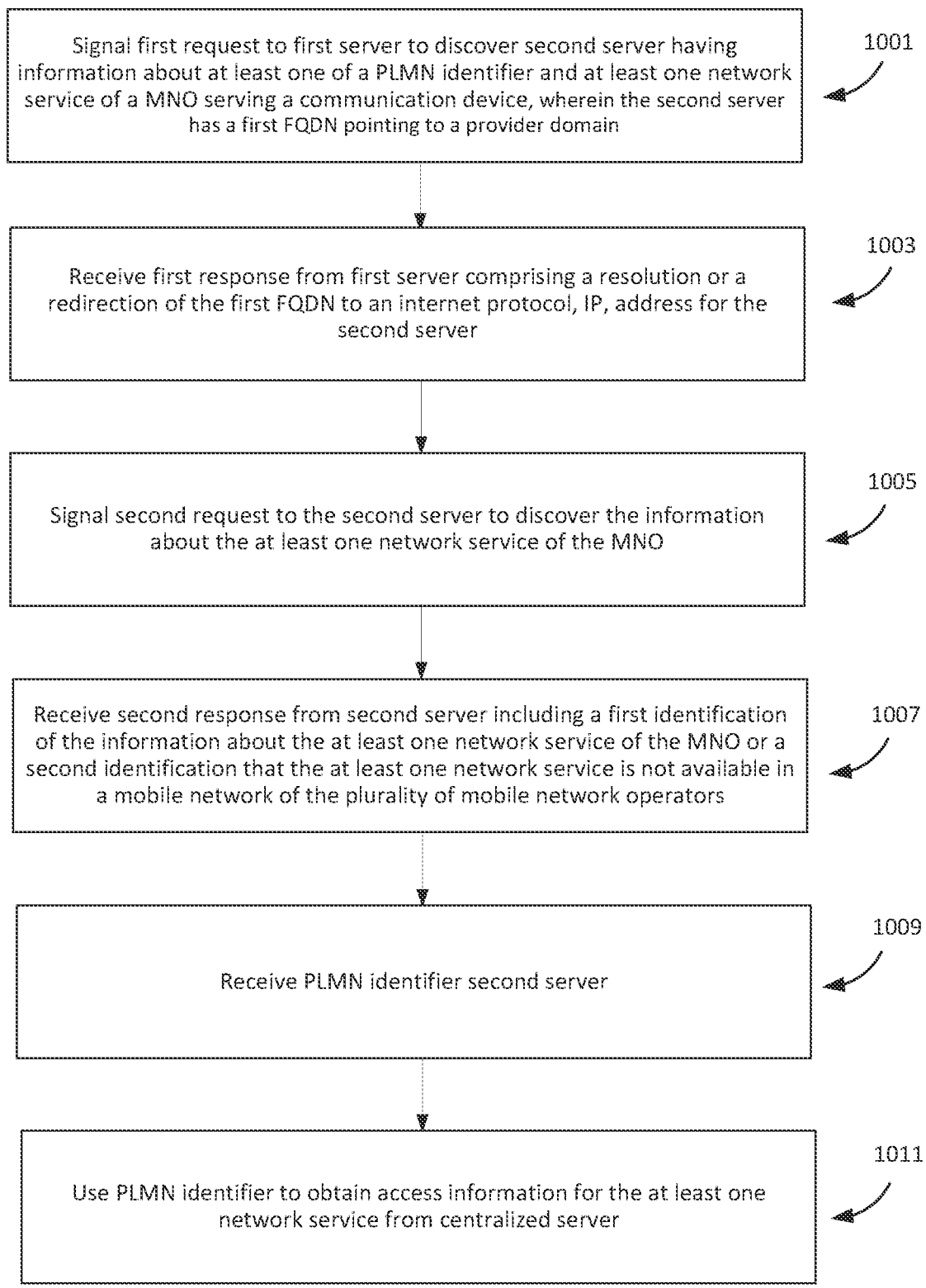
FIG. 10 is a flow chart illustrating operations of a communication device according to some embodiments of inventive concepts.

Referring to FIG. 10, in various embodiments, processing circuitry (703) of a communication device (700) in a telecommunications network (100) including a plurality of mobile networks (103a, 103b) operated by a plurality of mobile network operators (105a, 105b) and a provider domain (107), causes the communication device (700) to perform operations including the following. In block 1001, signaling a first request to a first server to discover a second server having information about at least one of a public land mobile network, PLMN, identifier and at least one network service of a mobile network operator, MNO, serving the communication device. The second server has a first fully qualified domain name, FQDN, pointing to the provider domain. Responsive to the first request, in the second block 1003, receiving a first response from the first server including a resolution or a redirection of the first FQDN to an internet protocol, IP, address for the second server.

In some embodiments, the first server is a domain name server, DNS, and the resolution or the redirection of the FQDN to an IP address for a second server comprises an IP anycast address for the second server.

In some embodiments, the first server is a first domain name server, DNS, and wherein the resolution or the redirection of the first FQDN comprises a canonical name, CNAME, resolution or redirection. The CNAME resolution or redirection includes the first response from the first server providing a redirection of the first FQDN to a second FQDN for a third server. The third server is a second domain name server. The communication device signals a second request to the third server to resolve the second FQDN of the third server; and receives a response from the third server including the IP address for the second server.

In some embodiments, the first request comprises an HTTPS certificate and a hypertext transfer protocol secure, HTTPS, request for a first uniform resource locator (URL). The first server is in or provided by the provider domain, and the redirection of the FQDN to an IP address for a second server includes an HTTPS redirection and delegation of the HTTPS certificate and the first URL to a second URL for a third server in the provider domain and a delegation of an HTTPS certificate.

In some embodiments, processing circuitry (703) causes the communication device (700) to perform further operations including signaling (1005) a second request to the second server to discover the information about the at least one network service of the MNO. Responsive to the second request, further operations include receiving (1007) a second response from the second server including a first identification of the information about the at least one network service of the MNO or a second identification that the at least one network service is not available in a mobile network of the plurality of mobile network operators.

In some embodiments, the information about the at least one network service includes at least one of a type of a service supported by the second server, an identification of how to access the service. an identification of valid or authorized parameters for the service, and information on a subscription of the communication device.

In some embodiments, processing circuitry (703) causes the communication device (700) to perform further operations including receiving (1009) the PLMN identifier from the second server. Further operations include using (1011) the PLMN identifier to obtain access information for the service from a centralized server.

Referring to FIG. 10, in various embodiments, the communication device (700) of embodiments herein may be adapted to perform any of the methods or operations of the communication device (700) discussed above.

Still referring to FIG. 10, in various embodiments, a computer program may include program code to be executed by processing circuitry (703) of a communication device (700). Execution of the program code causes the communication device (700) to perform operations of the communication device (700) discussed above.

Referring still to FIG. 10, in various embodiments, a computer program product may include a non-transitory storage medium including program code to be executed by processing circuitry (703) of a communication device (700). Execution of the program code may cause the communication device (700) to perform operations of the communication device (700) discussed above.

Various operations from the flow chart of FIG. 10 may be optional with respect to some embodiments of communication devices and related methods. Regarding methods of example embodiments set forth herein, for example, operations of blocks 1005-1011 of FIG. 10 may be optional.

Operations specific to a first server (e.g., MNO DNS Server 111, Central DNS Server 109, etc.) (implemented using the structure of the block diagram of FIG. 8) will now be discussed with reference to the flow chart of FIG. 11 according to some embodiments of inventive concepts. For example, modules may be stored in memory 805 of FIG. 8, and these modules may provide instructions so that when the instructions of a module are executed by respective network equipment processing circuitry 803, processing circuitry 803 performs respective operations of the flow chart. Each of the operations described in FIG. 11 can be combined and/or omitted in any combination with each other, and it is contemplated that all such combinations fall within the spirit and scope of this disclosure.

The block diagram in FIG. 8 illustrates an embodiment of a first server (800) which includes a processing circuitry (803) and a memory (805) coupled with the processing circuitry. The memory (805) includes instructions that when executed by the processing circuitry (803) causes the first server (800) to perform operations.

Figure 11:
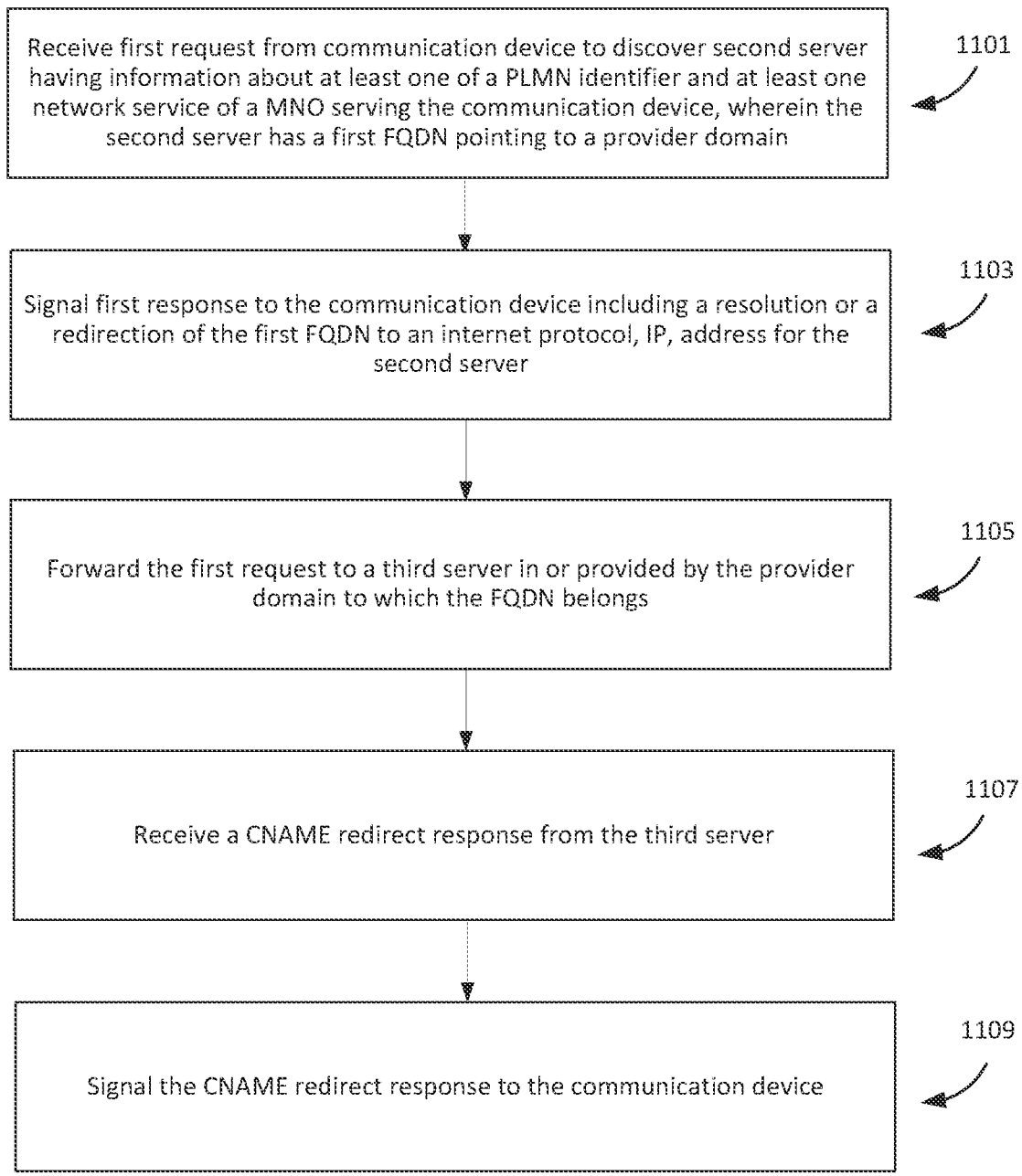
FIG. 11 is a flow chart illustrating operations of a first server according to some embodiments of inventive concepts.

Referring to FIG. 11, in various embodiments, processing circuitry (803) of a first server (800) in a telecommunications network (100) including a plurality of mobile networks (103a, 103b) operated by a plurality of mobile network operators (105a, 105b) and a provider domain (107), causes the first server (800) to perform operations including the following. In block 1101, a first request from a communication device to discover a second server having information about at least one of a public land mobile network, PLMN, identifier and at least one network service of a mobile network operator, MNO, serving the communication device. The second server has a first fully qualified domain name, FQDN, pointing to the provider domain. Responsive to the first request, in block 1103, signaling a first response to the communication device including a resolution or a redirection of the first FQDN to an internet protocol, IP, address for the second server.

In some embodiments, the first server is a domain name server, DNS, operated by the MNO and the resolution or the redirection of the FQDN to an IP address for the second server comprises a canonical name, CNAME, address for the second server.

In some embodiments, processing circuitry (803) causes the first server (800) to perform further operations including forwarding (1105) the first request to a third server in or provided by the provider domain to which the FQDN belongs. The operations further include, responsive to the forwarding, receiving (1107) a CNAME redirect response from the third serve. The operations further include signaling (1109) the CNAME redirect response to the communication device.

In some embodiments, the CNAME redirect response comprises a second FQDN for the second server.

Referring to FIG. 11, in various embodiments, a first server (800) may be adapted to perform any of the methods or operations of the first server (800) discussed above.

Still referring to FIG. 11, in various embodiments, a computer program may include program code to be executed by processing circuitry (803) of a first server (800). Execution of the program code causes the first server (800) to perform any of the methods or operations of the first server (800) discussed above.

Referring still to FIG. 11, in various embodiments, a computer program product may include a non-transitory storage medium including program code to be executed by processing circuitry (803) of a first server (800). Execution of the program code may cause the communication device (800) to perform any of the methods or operations of the first server (800) discussed above.

Various operations from the flow chart of FIG. 11 may be optional with respect to some embodiments of first servers and related methods. Regarding methods of example embodiments set forth herein, for example, operations of blocks 1105, 1107, and 1109 of FIG. 11 may be optional.

Operations specific to a second server (e.g., MNO Network Feature Server 113, Central Network Feature Server 115, etc.) (implemented using the structure of the block diagram of FIG. 9) will now be discussed with reference to the flow chart of FIG. 12 according to some embodiments of inventive concepts. For example, modules may be stored in memory 905 of FIG. 9, and these modules may provide instructions so that when the instructions of a module are executed by respective network equipment processing circuitry 903, processing circuitry 903 performs respective operations of the flow chart. Each of the operations described in FIG. 12 can be combined and/or omitted in any combination with each other, and it is contemplated that all such combinations fall within the spirit and scope of this disclosure.

The block diagram in FIG. 9 illustrates an embodiment of a second server (900) which includes a processing circuitry (903) and a memory (905) coupled with the processing circuitry. The memory (905) includes instructions that when executed by the processing circuitry (903) causes the second server (900) to perform operations.

Figure 12:
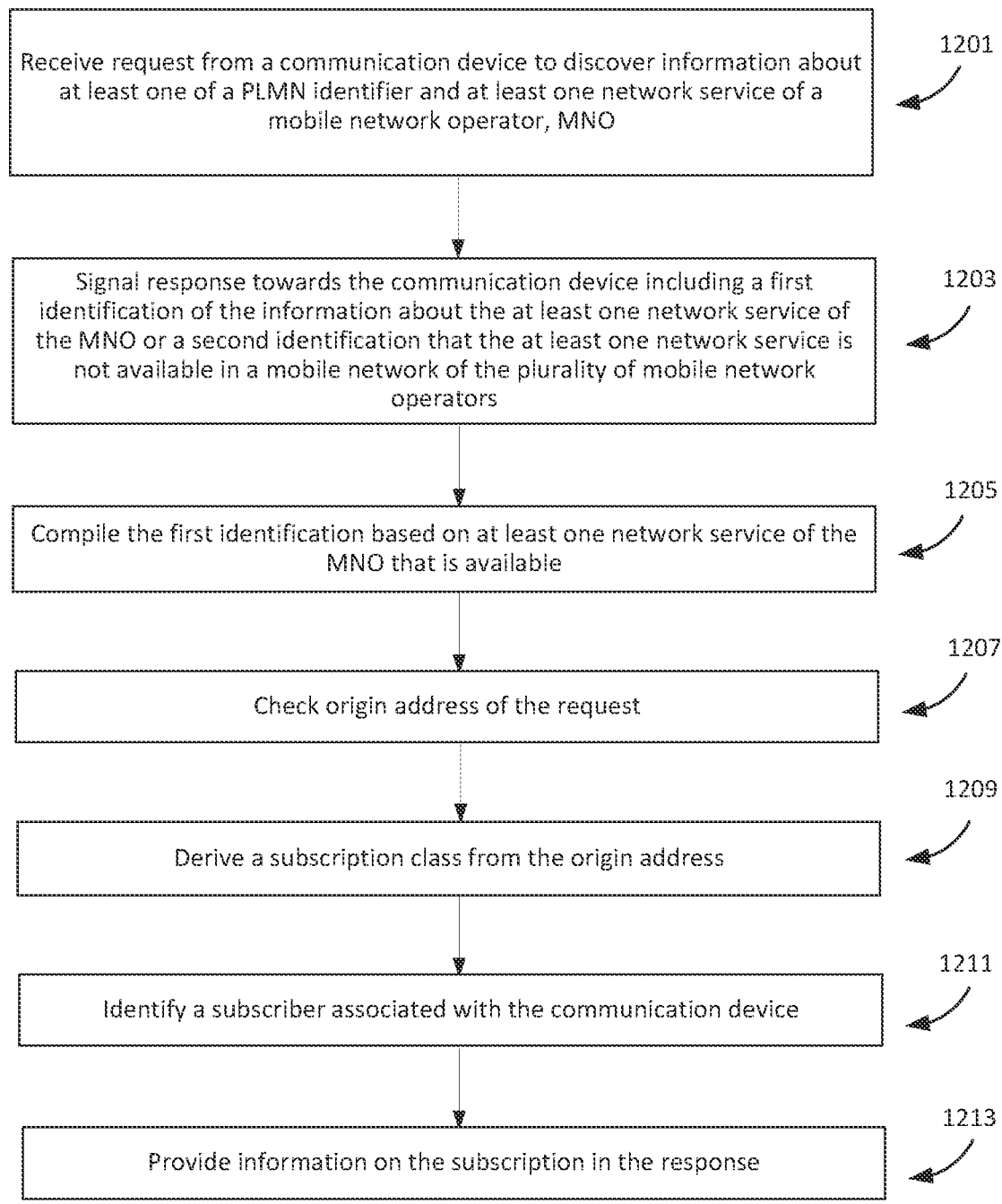
FIG. 12 is a flow chart illustrating operations of a second server according to some embodiments of inventive concepts.

Referring to FIG. 12, in various embodiments, processing circuitry (903) of a second server (900) in a telecommunications network (100) including a plurality of mobile networks (103a, 103b) operated by a plurality of mobile network operators (105a, 105b) and a provider domain (107), causes the second server (900) to perform operations including the following. In block 1201, receiving a request from a communication device to discover information about at least one of a public land mobile network, PLMN, identifier and at least one network service of a mobile network operator, MNO. In block 1203, responsive to the request, signaling a response towards the communication device including a first identification of the information about the at least one network service of the MNO or a second identification that the at least one network service is not available in a mobile network of the plurality of mobile network operators.

In some embodiments, the second server includes a server having information about the at least one network service of the MNO. The information about the at least one network service includes at least one of a type of a service supported by the second server, an identification of how to access the service, an identification of valid or authorized parameters for the service, and information on a subscription of the communication device.

In some embodiments, processing circuitry (903) causes the second server (900) to perform further operations including, responsive to the request, compiling (1205) the first identification based on at least one network service of the MNO that is available.

In some embodiments, processing circuitry (903) causes the second server (900) to perform further operations including checking (1207) an origin address of the request; and deriving (1209) a subscription class from the origin address.

In some embodiments, processing circuitry (903) causes the second server (900) to perform further operations including identifying (1211) a subscriber associated with the communication device; and providing (1213) information on the subscription in the response.

In some embodiments, the request and the response are hypertext transfer protocol secure, HTTPS, protected.

In some embodiments, the second server is configured with an internet protocol, IP, anycast address and wherein the second server has a hypertext transfer protocol secure, HTTPS, certificate from the provider domain.

In some embodiments, the first identification of the information about the at least one network service of the MNO includes one or more of the following: at least one MNO specific FQDN for at least one MNO network application interface, API; a set of parameters for the at least one MNO to invoke different APIs of different MNOs from the plurality of MNOs; a unique identifier of MNO network serving the communication device; a subscription and a subscription status information; and a filtering according to a requesting application.

In some embodiments, the second server acts as an application interface, API, gateway when the response comprises first identification of the information about the at least one network service.

In some embodiments, the response further comprises the PLMN identifier.

Referring to FIG. 12, in various embodiments, a second server (900) may be adapted to perform the methods or operations of the second server (900) discussed above.

Still referring to FIG. 12, in various embodiments, a computer program may include program code to be executed by processing circuitry (903) of a second server (900). Execution of the program code causes the second server (900) to perform the methods or operations of the second server (900) discussed above.

Referring still to FIG. 12, in various embodiments, a computer program product may include a non-transitory storage medium including program code to be executed by processing circuitry (903) of a second server (900). Execution of the program code may cause the second server (900) to perform the methods or operations of the second server (900) discussed above.

Various operations from the flow chart of FIG. 12 may be optional with respect to some embodiments of communication devices and related methods. Regarding methods of example embodiments set forth herein, for example, operations of blocks 1205-1213 of FIG. 12 may be optional.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Example embodiments are provided below. Reference numbers/letters are provided in parenthesis by way of example/illustration without limiting example embodiments to particular elements indicated by reference numbers/letters:

Listing of Embodiments

Embodiment 1. A method performed by a communication device (101*a*, 101*b*, 700) in a telecommunications network (100) comprising a plurality of mobile networks (103*a*, 103*b*) operated by a plurality of mobile network operators (105*a*, 105*b*) and a provider domain (107). The method includes signaling (1001) a first request to a first server to discover a second server having information about at least one of a public land mobile network, PLMN, identifier and at least one network service of a mobile network operator, MNO, serving the communication device. The second server has a first fully qualified domain name, FQDN, pointing to the provider domain; and responsive to the first request, receiving (1003) a first response from the first server comprising a resolution or a redirection of the first FQDN to an internet protocol, IP, address for the second server.

Embodiment 2. The method of Embodiment 1, wherein the first server is a domain name server, DNS, and the resolution or the redirection of the first FQDN to an IP address for a second server comprises an IP anycast address for the second server.

Embodiment 3. The method of Embodiment 1, wherein the first server is a first domain name server, DNS, and wherein the resolution or the redirection of the first FQDN comprises a canonical name, CNAME, resolution or redirection, wherein the CNAME resolution or redirection comprises: wherein the first response from the first server provides a redirection of the first FQDN to a second FQDN for a third server, wherein the third server is a second domain name server; signaling a second request to the third server to resolve the second FQDN of the third server; and receiving a response from the third server comprising the IP address for the second server.

Embodiment 4. The method of Embodiment 1, wherein the first request comprises an HTTPS certificate and a hypertext transfer protocol secure, HTTPS, request for a first uniform resource locator (URL), wherein the first server is in or provided by the provider domain, and wherein the redirection of the FQDN to an IP address for a second server comprises an HTTPS redirection and delegation of the HTTPS certificate and the first URL to a second URL for a third server in the provider domain and a delegation of an HTTPS certificate.

Embodiment 5. The method of any of claims 1 to 4, further comprising: signaling (1005) a second request to the second server to discover the information about the at least one network service of the MNO; and responsive to the second request, receiving (1007) a second response from the second server comprising a first identification of the information about the at least one network service of the MNO or a second identification that the at least one network service is not available in a mobile network of the plurality of mobile network operators.

Embodiment 6. The method of any of Embodiments 1 to 5, wherein the information about the at least one network service comprises at least one of a type of a service supported by the second server, an identification of how to access the service, an identification of valid or authorized parameters for the service, and information on a subscription of the communication device.

Embodiment 7. The method of any of Embodiments 1 to 6, further comprising: receiving (1009) the PLMN identifier from the second server; and using (1011) the PLMN identifier to obtain access information for the service from a centralized server.

Embodiment 8. A communication device (700) comprising: processing circuitry (703); and memory (705) coupled with the processing circuitry, wherein the memory includes instructions that when executed by the processing circuitry causes the communication device to perform operations according to any of Embodiments 1 to 7.

Embodiment 9. A communication device (700) adapted to perform according to any of Embodiments 1 to 7.

Embodiment 10. A computer program comprising program code to be executed by processing circuitry (703) of a communication device (700), whereby execution of the program code causes the communication device to perform operations according to any of embodiments 1-7.

Embodiment 11. A computer program product comprising a non-transitory storage medium including program code to be executed by processing circuitry (703) of a communication device (700), whereby execution of the program code causes the communication device (700) to perform operations according to any of Embodiments 1 to 7.

Embodiment 12. A method performed by a first server (111, 115, 800) in a telecommunications network comprising a plurality of mobile networks operated by a plurality of mobile network operators and an provider domain. The method including receiving (1101) a first request from a communication device to discover a second server having information about at least one of a public land mobile network, PLMN, identifier and at least one network service of a mobile network operator, MNO, serving the communication device, wherein the second server has a first fully qualified domain name, FQDN, pointing to the provider domain; and responsive to the first request, signaling (1103) a first response to the communication device comprising a resolution or a redirection of the first FQDN to an internet protocol, IP, address for the second server.

Embodiment 13. The method of Embodiment 12, wherein the first server is a domain name server, DNS, operated by the MNO and the resolution or the redirection of the FQDN to an IP address for the second server comprises a canonical name, CNAME, address for the second server.

Embodiment 14. The method of any of Embodiments 12 to 13, further comprising: forwarding (1105) the first request to a third server in or provided by the provider domain to which the FQDN belongs; responsive to the forwarding, receiving (1107) a CNAME redirect response from the third server; and signaling (1109) the CNAME redirect response to the communication device.

Embodiment 15. The method of Embodiment 14, wherein the CNAME redirect response comprises a second FQDN for the second server.

Embodiment 16. A first server (111, 800) comprising: processing circuitry (803); and memory (805) coupled with the processing circuitry, wherein the memory includes instructions that when executed by the processing circuitry causes the first server to perform operations according to any of Embodiments 12 to 15.

Embodiment 17. A first server (111, 800) adapted to perform according to any of Embodiments 12 to 15.

Embodiment 18. A computer program comprising program code to be executed by processing circuitry (803) of a first server (111, 800), whereby execution of the program code causes the first server to perform operations according to any of embodiments 12-15.

Embodiment 19. A computer program product comprising a non-transitory storage medium including program code to be executed by processing circuitry (803) of a first server (111, 800), whereby execution of the program code causes the first server (111, 800) to perform operations according to any of Embodiments 12 to 15.

Embodiment 20. A method performed by a second server (113, 115, 900) in a telecommunications network comprising a plurality of mobile networks operated by a plurality of mobile network operators and an provider domain. The method including receiving (1201) a request from a communication device to discover information about at least one of a public land mobile network, PLMN, identifier and at least one network service of a mobile network operator, MNO; and responsive to the request, signaling (1203) a response towards the communication device comprising a first identification of the information about the at least one network service of the MNO or a second identification that the at least one network service is not available in a mobile network of the plurality of mobile network operators.

Embodiment 21. The method of Embodiment 20, wherein the second server comprises a server having information about the at least one network service of the MNO, and wherein the information about the at least one network service comprises at least one of a type of a service supported by the second server, an identification of how to access the service, an identification of valid or authorized parameters for the service, and information on a subscription of the communication device.

Embodiment 22. The method of any of Embodiments 20 to 21, further comprising: responsive to the request, compiling (1205) the first identification based on at least one network service of the MNO that is available.

Embodiment 23. The method of any of Embodiments 20 to 22, further comprising: checking (1207) an origin address of the request; and deriving (1209) a subscription class from the origin address.

Embodiment 24. The method of any of Embodiments 20 to 23, further comprising: identifying (1211) a subscriber associated with the communication device; and providing (1213) information on the subscription in the response.

Embodiment 25. The method of any of Embodiments 20 to 22, wherein the request and the response are hypertext transfer protocol secure, HTTPS, protected.

Embodiment 26. The method of any of Embodiments 20 to 25, wherein the second server is configured with an internet protocol, IP, anycast address and wherein the second server has a hypertext transfer protocol secure, HTTPS, certificate from the provider domain.

Embodiment 27. The method of any of Embodiments 20 to 26, wherein the first identification of the information about the at least one network service of the MNO comprises one or more of the following: at least one MNO specific FQDN for at least one MNO network application interface, API; a set of parameters for the at least one MNO to invoke different APIs of different MNOs from the plurality of MNOs; a unique identifier of MNO network serving the communication device; a subscription and a subscription status information; and a filtering according to a requesting application.

Embodiment 28. The method of any of Embodiments 20 to 27, wherein the second server acts as an application interface, API, gateway when the response comprises first identification of the information about the at least one network service.

Embodiment 29. The method of any of Embodiments 20 to 28, wherein the response further comprises the PLMN identifier.

Embodiment 30. A second server (113, 115, 900) comprising: processing circuitry (903); and memory (905) coupled with the processing circuitry, wherein the memory includes instructions that when executed by the processing circuitry causes the second server to perform operations according to any of Embodiments 18 to 26.

Embodiment 31. A second server (113, 115, 900) adapted to perform according to any of Embodiments 20 to 29.

Embodiment 32. A computer program comprising program code to be executed by processing circuitry (903) of a second server (113, 115, 900), whereby execution of the program code causes the second server to perform operations according to any of embodiments 20-29.

Embodiment 33. A computer program product comprising a non-transitory storage medium including program code to be executed by processing circuitry (903) of a second server (113, 115, 900), whereby execution of the program code causes the second server (113, 115, 900) to perform operations according to any of Embodiments 20 to 29.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 13:
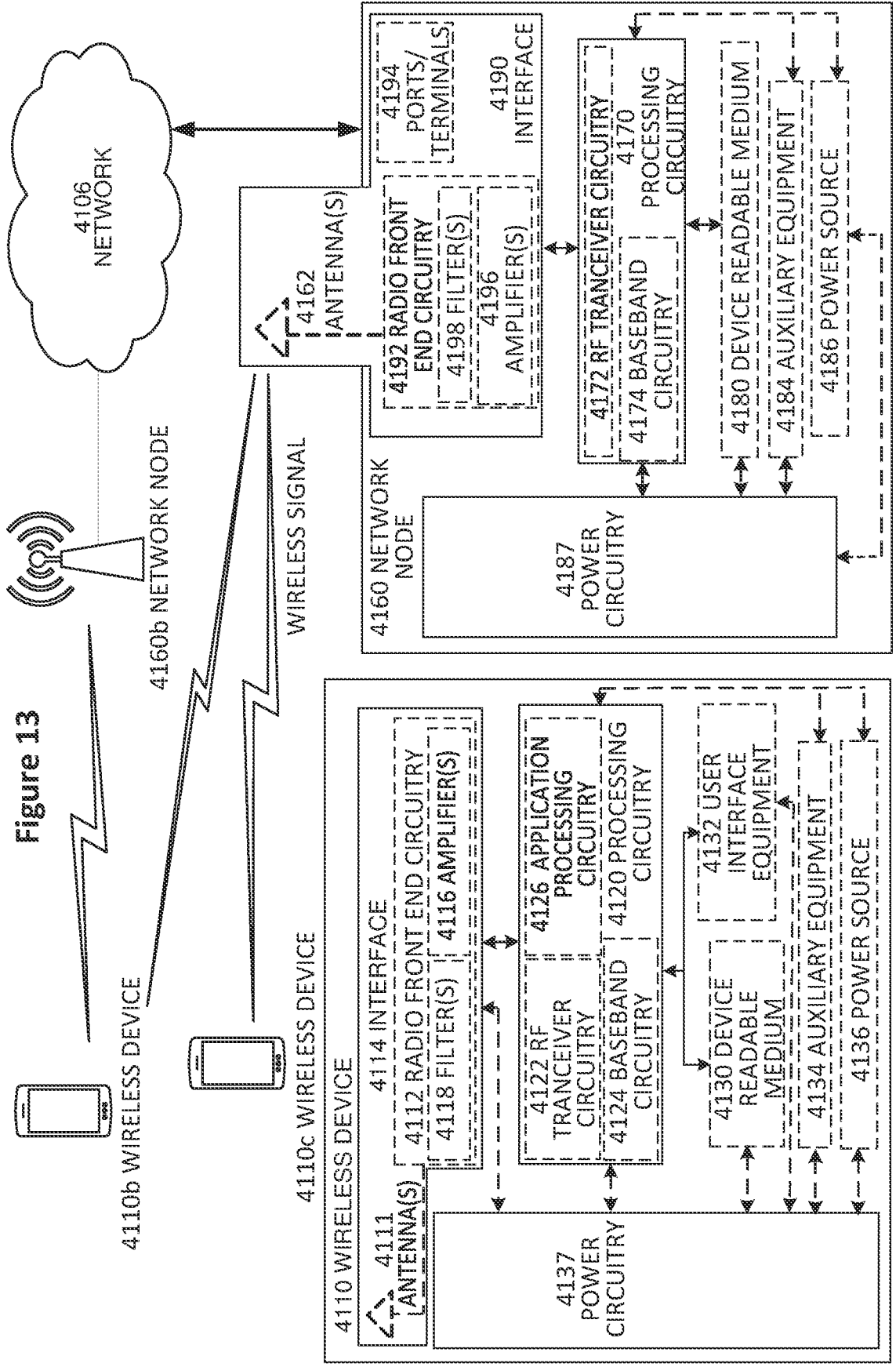
FIG. 13 is a block diagram of a wireless network in accordance with some embodiments.

FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units.

In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 13 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 14:
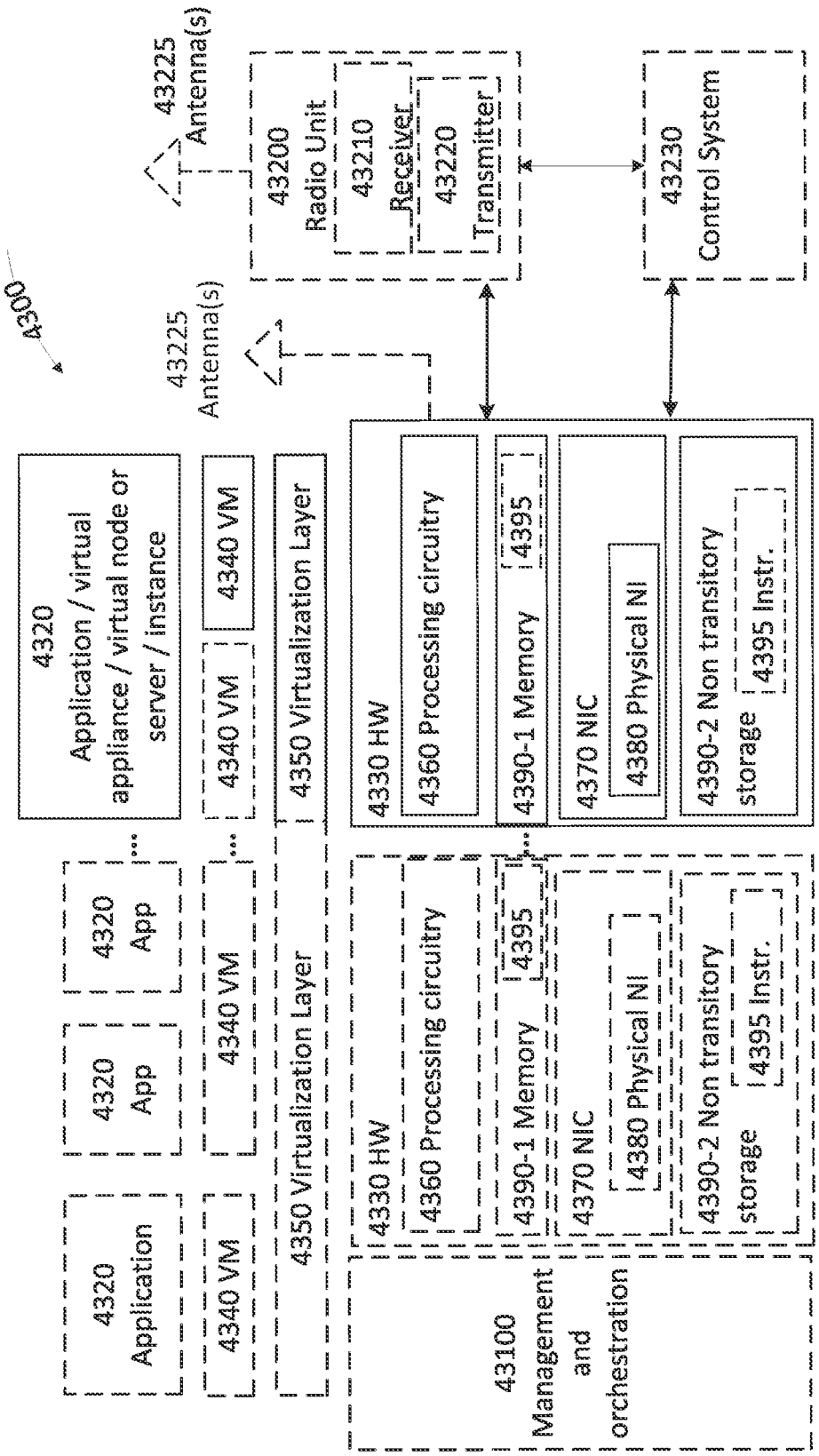
FIG. 14 is a block diagram of a virtualization environment in accordance with some embodiments.

FIG. 14 illustrates a virtualization environment in accordance with some embodiments.

FIG. 14 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 14, hardware 4330 may be a standalone network node with generic or specific components. Hardware 4330 may comprise antenna 43225 and may implement some functions via virtualization. Alternatively, hardware 4330 may be part of a larger cluster of hardware (e.g., such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 14.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 15:
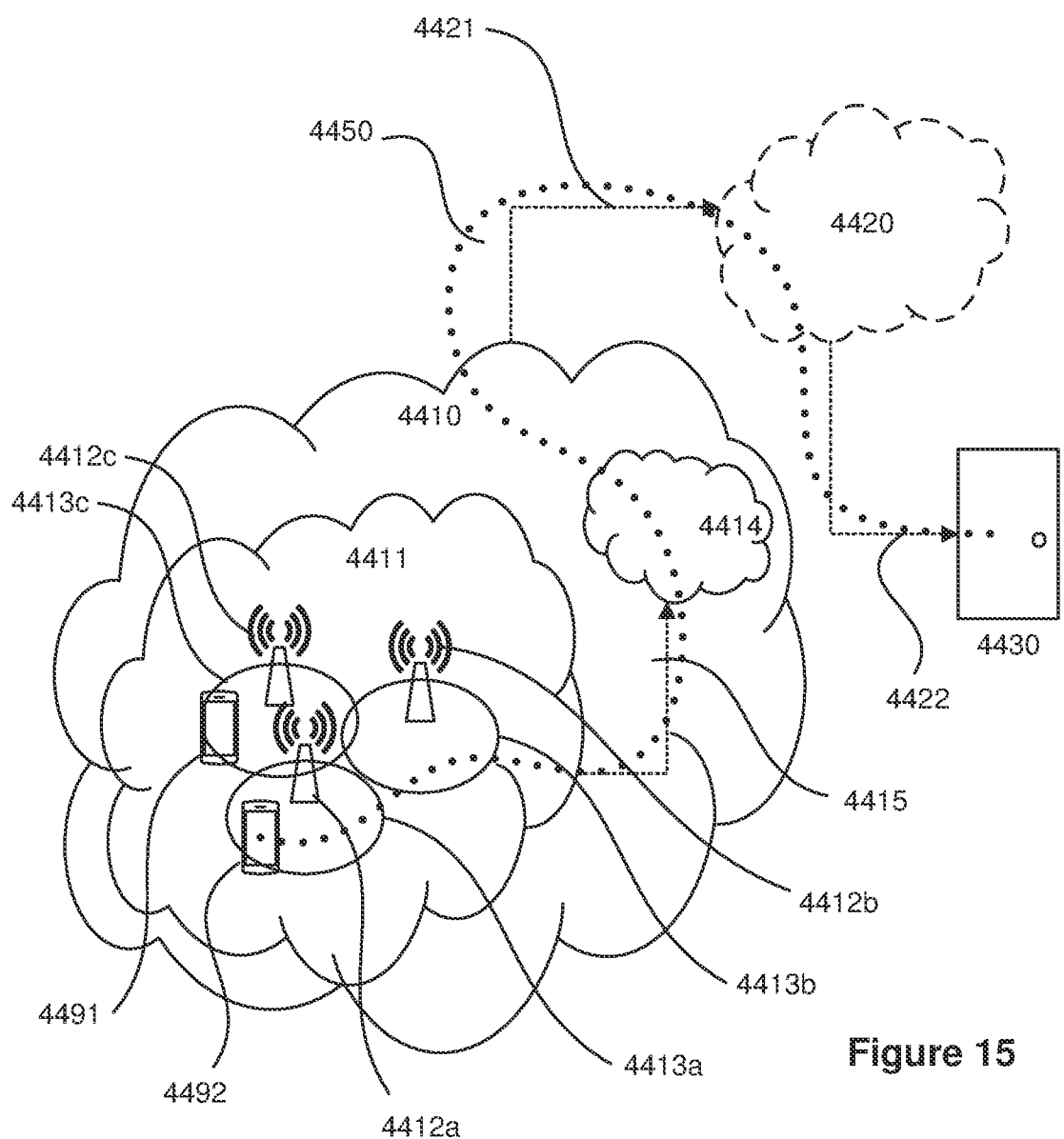
FIG. 15 is a block diagram of a telecommunication network connected via an intermediate network to a host computer in accordance with some embodiments.

FIG. 15 illustrates a telecommunication network connected via an intermediate network to a host computer in accordance with some embodiments.

With reference to FIG. 15, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 15 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
5G 5th Generation
eNB E-UTRAN NodeB
E-UTRA Evolved UTRA
E-UTRAN Evolved UTRAN
gNB Base station in NR
GSM Global System for Mobile communication
LTE Long-Term Evolution
MME Mobility Management Entity
MSC Mobile Switching Center
NR New Radio
OSS Operations Support System
OTDOA Observed Time Difference of Arrival
O&M Operation and Maintenance
PLMN Public Land Mobile Network
RAN Radio Access Network
RAT Radio Access Technology
RLM Radio Link Management
RNC Radio Network Controller
RS Reference Signal
SON Self Optimized Network
UE User Equipment
UL Uplink
UMTS Universal Mobile Telecommunication System
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a communication device in a telecommunications network comprising a plurality of mobile networks operated by a plurality of mobile network operators and a provider domain, the method comprising:
   signaling a first request to a first server to discover a second server having information about at least one of a public land mobile network, PLMN, identifier and at least one network service of a mobile network operator, MNO, serving the communication device, the first request including a first fully qualified domain name, FQDN, of the second server, pointing to the provider domain;
   responsive to the first request, receiving a first response from the first server comprising a resolution or a redirection of the first FQDN to an internet protocol, IP, address for the second server having the information;
   signaling a second request to the second server to discover the information about the at least one network service of the MNO; and
   responsive to the second request, receiving a second response from the second server comprising a first identification of the information about the at least one network service of the MNO, said first identification including one or more of at least one MNO specific FQDN for at least one MNO network application interface, API; a set of parameters for the at least one MNO to invoke different APIs of different MNOs from the plurality of MNOs: a unique identifier of MNO network serving the communication device; a subscription and a subscription status information; and a filtering according to a requesting application.

2. The method of claim 1, wherein the at least one network service comprises a streaming service having content for delivery to the communication device through the PLMN.

3. The method of claim 1, wherein the information comprises service access information for the at least one network service of the MNO, the service access information comprising at least one of an address and at least one parameter for the communication device for activating reception of a downlink streaming session of the at least one network service or of a feature of the at least one network service.

4. The method of claim 3, wherein the at least one parameter comprises at least one of:
   a parameter of baseline service access information for the downlink streaming session; a streaming access parameter when a content hosting feature is activated for the downlink streaming session; a parameter for a consumption reporting interval when a consumption reporting feature is activated for the downlink streaming session; a parameter for a dynamic policy invocation configuration when a dynamic policy invocation feature is activated for the downlink streaming session; a parameter for a metrics configuration set when a metrics collection and reporting feature is activated for a downlink streaming session; and a parameter for media steaming application function based network assistance configuration when a media streaming application function based network assistance is activated for the downlink streaming session.

5. The method of claim 1, wherein the first server is a domain name server, DNS, and the resolution or the redirection of the first FQDN to an IP address for a second server comprises an IP anycast address for the second server.

6. The method of claim 1, wherein the first server is a first domain name server, DNS, and wherein the resolution or the redirection of the first FQDN comprises a canonical name, CNAME, resolution or redirection, wherein the CNAME resolution or redirection comprises:
   wherein the first response from the first server provides a redirection of the first FQDN to a second FQDN for a third server, wherein the third server is a second domain name server;
   signaling a second request to the third server to resolve the second FQDN of the third server; and
   receiving a response from the third server comprising the IP address for the second server.

7. The method of claim 1, wherein the first request comprises an HTTPS certificate and a hypertext transfer protocol secure, HTTPS, request for a first uniform resource locator (URL), wherein the first server is in or provided by the provider domain, and wherein the redirection of the FQDN to an IP address for a second server comprises an HTTPS redirection and delegation of the HTTPS certificate and the first URL to a second URL for a third server in the provider domain and a delegation of an HTTPS certificate.

8. The method of claim 1, wherein the information about the at least one network service comprises at least one of a type of a service supported by the second server, an identification of how to access the service, an identification of valid or authorized parameters for the service, and information on a subscription of the communication device.

9. The method of claim 1, further comprising:
receiving the PLMN identifier from the second server; and
using the PLMN identifier to obtain access information for the at least one network service from a centralized server.

10. A method performed by a first server and a second server in a telecommunications network comprising a plurality of mobile networks operated by a plurality of mobile network operators and a provider domain, the method comprising:
receiving, by the first server, a first request from a communication device to discover a second server having information about at least one of a public land mobile network, PLMN, identifier and at least one network service of a mobile network operator, MNO, serving the communication device, the first request including a first fully qualified domain name, FQDN, of the second server, pointing to the provider domain; and
responsive to the first request, signaling, by the first server, a first response to the communication device comprising a resolution or a redirection of the first FQDN to an internet protocol, IP, address for the second server having the information;
receiving, by the second server, a request from the communication device to discover information about the at least one network service of a mobile network operator, MNO: and
responsive to the request, signaling, by the second server, a response towards the communication device comprising a first identification of the information about the at least one network service of the MNO, said first identification including one or more of at least one MNO specific FQDN for at least one MNO network application interface, API; a set of parameters for the at least one MNO to invoke different APIs of different MNOs from the plurality of MNOs: a unique identifier of MNO network serving the communication device; a subscription and a subscription status information; and a filtering according to a requesting application.

11. The method of claim 10, wherein the at least one network service comprises a streaming service having content for delivery to the communication device through the PLMN.

12. The method of claim 10, wherein the information comprises service access information for the at least one network service of the MNO, the service access information comprising at least one of an address and at least one parameter for the communication device for activating reception of a downlink streaming session of the at least one network service or of a feature of the at least one network service.

13. The method of claim 12, wherein the at least one parameter comprises at least one of:
a parameter of baseline service access information for the downlink streaming session; a streaming access parameter when a content hosting feature is activated for the downlink streaming session; a parameter for a consumption reporting interval when a consumption reporting feature is activated for the downlink streaming session; a parameter for a dynamic policy invocation configuration when a dynamic policy invocation feature is activated for the downlink streaming session; a parameter for a metrics configuration set when a metrics collection and reporting feature is activated for a downlink streaming session; and a parameter for media steaming application function based network assistance configuration when a media streaming application function based network assistance is activated for the downlink streaming session.

14. The method of claim 13, wherein the first server is a domain name server, DNS, operated by the MNO and the resolution or the redirection of the FQDN to an IP address for the second server comprises a canonical name, CNAME, address for the second server.

15. The method of claim 10, further comprising:
forwarding the first request to a third server in or provided by the provider domain to which the FQDN belongs;
responsive to the forwarding, receiving a CNAME redirect response from the third server; and
signaling the CNAME redirect response to the communication device.

16. The method of claim 15, wherein the CNAME redirect response comprises a second FQDN for the second server.

17. A method performed by a second server in a telecommunications network comprising a plurality of mobile networks operated by a plurality of mobile network operators and a provider domain, the method comprising:
receiving a request from a communication device to discover information about at least one of a public land mobile network, PLMN, identifier and at least one network service of a mobile network operator, MNO; and
responsive to the request, signaling a response towards the communication device comprising a first identification of the information about the at least one network service of the MNO, said first identification including one or more of at least one MNO specific FQDN for at least one MNO network application interface, API; a set of parameters for the at least one MNO to invoke different APIs of different MNOs from the plurality of MNOs: a unique identifier of MNO network serving the communication device; a subscription and a subscription status information; and a filtering according to a requesting application.

18. The method of claim 17, wherein the at least one network service comprises a streaming service having content for delivery to the communication device through the PLMN.

19. The method of claim 17, wherein the second server comprises a server having information about the at least one network service of the MNO, and wherein the information about the at least one network service comprises at least one of a type of a service supported by the second server, an identification of how to access the service, an identification of valid or authorized parameters for the service, and information on a subscription of the communication device.

20. The method of claim 17, wherein the first identification of the information about the at least one network service of the MNO comprises service access information including at least one of an address and at least one parameter for the communication device for activating reception of a downlink streaming session of the at least one network service or of a feature of the at least one network service.

21. The method of claim 20, wherein the at least one parameter comprises:
a parameter of baseline service access information for the downlink streaming session; a streaming access parameter when a content hosting feature is activated for the downlink streaming session; a parameter for a consumption reporting interval when a consumption reporting feature is activated for the downlink streaming session; a parameter for a dynamic policy invocation configuration when a dynamic policy invocation feature is activated for the downlink streaming session; a parameter for a metrics configuration set when a metrics collection and reporting feature is activated for a downlink streaming session; and a parameter for media steaming application function based network assistance configuration when a media streaming application function based network assistance is activated for the downlink streaming session.

22. The method of claim 17, further comprising:
responsive to the request, compiling the first identification based on the at least one network service of the MNO that is available.

23. The method of claim 17, further comprising:
checking an origin address of the request; and
deriving a subscription class from the origin address.

24. The method of claim 17, further comprising:
identifying a subscriber associated with the communication device; and
providing information on a subscription of the subscriber in the response.

25. The method of claim 17, wherein the request and the response are hypertext transfer protocol secure, HTTPS, protected.

26. The method of claim 17, wherein the second server is configured with an internet protocol, IP, anycast address and wherein the second server has a hypertext transfer protocol secure, HTTPS, certificate from the provider domain.

* * * * *

UNITED STATES PATENT AND TRADEMARK OFFICE
CERTIFICATE OF CORRECTION

PATENT NO. : 11,997,173 B2
APPLICATION NO. : 17/916002
DATED : May 28, 2024
INVENTOR(S) : Lohmar et al.

It is certified that error appears in the above-identified patent and that said Letters Patent is hereby corrected as shown below:

In the Drawings

In Fig. 13, Sheet 12 of 14, for Tag "4172", Line 1, delete "TRANCEIVER" and insert -- TRANSCEIVER --, therefor.

In Fig. 13, Sheet 12 of 14, for Tag "4122", Line 2, delete "TRANCEIVER" and insert -- TRANSCEIVER --, therefor In the Specification In Column 5, Line 63, delete "etc.)" and insert -- etc.), --, therefor.

In Column 6, Line 41, delete "such as an" and insert -- an --, therefor.

In Column 6, Line 57, delete "be" and insert -- is --, therefor.

In Column 7, Line 10, delete "FIG. 1)," and insert -- FIG. 1)), --, therefor.

In Column 7, Line 12, delete "FIG. 1)" and insert -- FIG. 1)) --, therefor.

In Column 7, Line 37, delete "currently" and insert -- current --, therefor.

In Column 7, Line 38, delete "101a)." and insert -- 105a). --, therefor.

In Column 7, Line 48, delete "101a)." and insert -- 105a). --, therefor.

In Column 7, Line 58, delete "needed." and insert -- is needed. --, therefor.

In Column 7, Line 58, delete "101a)" and insert -- 105a) --, therefor.

Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,997,173 B2

In Column 7, Line 60, delete "As" and insert -- As a --, therefor.

In Column 8, Line 50, delete "Rel. 16" and insert -- Rel. 16) --, therefor.

In Column 8, Line 56, delete "(i.e." and insert -- i.e. --, therefor.

In Column 10, Line 23, delete "sever" and insert -- server --, therefor.

In Column 11, Line 26, delete "301" and insert -- 301) --, therefor.

In Column 11, Line 43, delete "As" and insert -- As a --, therefor.

In Column 12, Line 65, delete "As" and insert -- As a --, therefor.

In Column 15, Line 62, delete "service." and insert -- service, --, therefor.

In Column 27, Line 67, delete "circuitry 4190" and insert -- circuitry 4192 --, therefor.

In Column 29, Line 15, delete "(CPE)." and insert -- (CPE), --, therefor.

In Column 29, Line 33, delete "etc.)" and insert -- etc.), --, therefor.

In Column 30, Line 2, delete "circuitry 4114" and insert -- circuitry 4112 --, therefor.

In Column 33, Line 2, delete "memory 4390. Memory 4390" and insert -- memory 4390-1. Memory 4390-1 --, therefor.

In Column 35, Line 43, delete "Management" and insert -- Monitoring --, therefor.

In Column 35, Line 46, delete "Optimized" and insert -- Organizing --, therefor.

In Column 35, Line 53, delete "Wide" and insert -- Wideband --, therefor.

In Column 35, Line 54, delete "Wide" and insert -- Wireless --, therefor.

In the Claims

In Column 38, Line 38, in Claim 4, delete "steaming" and insert -- streaming --, therefor.

In Column 39, Line 25, in Claim 10, delete "domain; and" and insert -- domain; --, therefor.

In Column 39, Line 34, in Claim 10, delete "MNO: and" and insert -- MNO; and --, therefor.

In Column 40, Line 6, in Claim 13, delete "steaming" and insert -- streaming --, therefor.

In Column 41, Line 11, in Claim 21, delete "steaming" and insert -- streaming --, therefor.